(12) United States Patent
Carpenter et al.

(10) Patent No.: US 12,104,359 B2
(45) Date of Patent: Oct. 1, 2024

(54) MONITORING GROUND-ENGAGING PRODUCTS FOR EARTH WORKING EQUIPMENT

(71) Applicant: ESCO Group LLC, Portland, OR (US)

(72) Inventors: Christopher M. Carpenter, Tualatin, OR (US); Karsten D. Zuendel, Portland, OR (US); Noah D. Cowgill, Portland, OR (US); Joshua K. Hoyt, Portland, OR (US); David J. Sayler, Portland, OR (US)

(73) Assignee: ESCO GROUP LLC, Portland, OR (US)

( * ) Notice: Subject to any disclaimer, the term of this patent is extended or adjusted under 35 U.S.C. 154(b) by 308 days.

(21) Appl. No.: 15/043,433

(22) Filed: Feb. 12, 2016

(65) Prior Publication Data

US 2016/0237640 A1     Aug. 18, 2016

Related U.S. Application Data

(60) Provisional application No. 62/234,463, filed on Sep. 29, 2015, provisional application No. 62/198,552, (Continued)

(51) Int. Cl.
*E02F 9/26* (2006.01)
*E02F 9/28* (2006.01)
(Continued)

(52) U.S. Cl.
CPC ............... *E02F 9/26* (2013.01); *E02F 9/267* (2013.01); *E02F 9/2825* (2013.01);
(Continued)

(58) Field of Classification Search
CPC ....................................................... E02F 9/26
See application file for complete search history.

(56) References Cited

U.S. PATENT DOCUMENTS

| 561,758 A | 6/1896 | Brewer |
| 3,990,805 A | 11/1976 | Ducrohet |

(Continued)

FOREIGN PATENT DOCUMENTS

| AU | 2005227398 | 4/2006 | |
| AU | 2005227398 B1 * | 4/2006 | ................ E02F 9/26 |

(Continued)

OTHER PUBLICATIONS

English translations of Evidence 1 (Typical Application Cases of Power Grid Device Detection Technology edited by Operation and Maintenance Group of State Grid Corporation of China, p. 69 and 70, China Electric PowerPress, of Dec. 2014) and Evidence2 (Sense and Avoid in UAS: Research and Applications by Plamen Angelov (Britain), p. 14 and 15, National Defense Industry Press, of Nov. 2014).

(Continued)

*Primary Examiner* — Shelley Chen
(74) *Attorney, Agent, or Firm* — Steven Schad; Palmer Dzurella

(57) ABSTRACT

A system and tool for monitoring ground-engaging products for earth working equipment that can monitor characteristics such as part identification, presence, condition, usage, and/or performance of the products on earth working equipment used, for example, in mining, construction, and dredging environments. The monitoring tool includes or is supported by a mobile device that is separate from the earth working equipment. Supporting the monitoring tool on a mobile device can, e.g., provide unique vantage points to monitor the earth working equipment products, monitor the products without inhibiting the operation of the earth working equipment or endangering personnel, closely approach areas of interest for secure and reliable gathering of information, monitor multiple earth working equipment, and/or be pro- (Continued)

tected from the vibrations and impact shocks that can be associated with earth working equipment.

15 Claims, 12 Drawing Sheets

Related U.S. Application Data filed on Jul. 29, 2015, provisional application No. 62/175,109, filed on Jun. 12, 2015, provisional application No. 62/151,124, filed on Apr. 22, 2015, provisional application No. 62/116,216, filed on Feb. 13, 2015.

(51) Int. Cl.
  B64C 39/02 (2023.01)
  B64U 101/30 (2023.01)
(52) U.S. Cl.
  CPC .......... *E02F 9/2833* (2013.01); *E02F 9/2841* (2013.01); *B64C 39/024* (2013.01); *B64U 2101/30* (2023.01)

(56) References Cited

U.S. PATENT DOCUMENTS

| | | | |
|---|---|---|---|
| 4,001,798 A | 1/1977 | Robinson | |
| 4,181,360 A | 1/1980 | Wilson | |
| 4,187,626 A | 2/1980 | Greer et al. | |
| 4,368,919 A | 1/1983 | Whittaker et al. | |
| 4,399,554 A | 8/1983 | Perkins, III et al. | |
| 4,407,081 A | 10/1983 | Hanson | |
| 4,499,960 A | 2/1985 | Ehrich | |
| 4,550,512 A | 11/1985 | Felstet | |
| 4,604,604 A | 8/1986 | Mann | |
| 4,627,013 A | 12/1986 | Ichiyama et al. | |
| 4,655,082 A | 4/1987 | Peterson | |
| 4,700,224 A | 10/1987 | Miyasaka et al. | |
| 4,709,265 A | 11/1987 | Silverman et al. | |
| 4,809,794 A | 3/1989 | Blair et al. | |
| 4,818,990 A | 4/1989 | Fernandes | |
| 4,845,763 A | 7/1989 | Bandyopadhyay et al. | |
| 4,932,145 A | 6/1990 | Reeves, Jr. | |
| 5,092,657 A | 3/1992 | Bryan, Jr. | |
| 5,144,762 A | 9/1992 | Robinson | |
| 5,401,115 A | 3/1995 | Musil et al. | |
| 5,555,652 A | 9/1996 | Ashby | |
| 5,701,179 A | 12/1997 | Chatterjee | |
| 5,743,031 A | 4/1998 | Launder et al. | |
| 5,824,965 A | 10/1998 | Fujii et al. | |
| 5,828,148 A * | 10/1998 | Niggemann .............. H02K 5/12 |
| | | | 310/86 |
| 5,850,341 A | 12/1998 | Fournier et al. | |
| 5,871,391 A | 2/1999 | Pryor | |
| 5,926,558 A | 7/1999 | Zelt, III et al. | |
| 5,937,550 A | 8/1999 | Emrich | |
| 6,032,390 A | 3/2000 | Bierwith | |
| 6,360,850 B1 | 3/2002 | Odisho et al. | |
| 6,363,173 B1 | 3/2002 | Stentz et al. | |
| 6,408,258 B1 | 6/2002 | Richer | |
| 6,470,606 B1 | 10/2002 | Nagahiro et al. | |
| 6,497,153 B1 | 12/2002 | Hoskinson et al. | |
| 6,518,519 B1 | 2/2003 | Crane, III et al. | |
| 6,523,586 B1 | 2/2003 | Eromaeki et al. | |
| 6,868,314 B1 | 3/2005 | Frink | |
| 6,870,485 B2 | 3/2005 | Lujan et al. | |
| 6,907,384 B2 | 6/2005 | Adachi et al. | |
| 6,957,622 B2 | 10/2005 | Boettcher et al. | |
| 6,990,390 B2 | 1/2006 | Groth et al. | |
| 7,223,062 B1 | 5/2007 | Emerson | |
| 7,248,154 B2 | 7/2007 | Menke | |
| 7,422,391 B2 | 9/2008 | Holl et al. | |
| 7,509,638 B2 | 3/2009 | Backhouse et al. | |
| 7,574,821 B2 | 8/2009 | Furem | |
| 7,579,952 B2 | 8/2009 | Osterhold | |
| 7,631,560 B2 | 12/2009 | Lund et al. | |
| 7,677,079 B2 | 3/2010 | Radziszewski et al. | |
| 7,695,071 B2 | 4/2010 | Jackson et al. | |
| 7,832,126 B2 | 11/2010 | Koellner et al. | |
| 7,836,615 B2 | 11/2010 | Winter | |
| 7,874,085 B1 | 1/2011 | Winter et al. | |
| 7,908,928 B2 | 3/2011 | Vik | |
| 7,912,612 B2 | 3/2011 | Janardhan et al. | |
| 7,930,844 B2 | 4/2011 | Quarfordt et al. | |
| 7,941,306 B2 | 5/2011 | Furem et al. | |
| 8,024,874 B2 | 9/2011 | McClanahan et al. | |
| 8,050,489 B2 | 11/2011 | Eberle et al. | |
| 8,087,477 B2 | 1/2012 | Sullivan et al. | |
| 8,150,105 B2 | 4/2012 | Mian et al. | |
| 8,190,335 B2 | 5/2012 | Vik et al. | |
| 8,240,070 B1 | 8/2012 | Phillips | |
| 8,284,096 B2 | 10/2012 | Martinez Godoy | |
| 8,306,797 B2 | 11/2012 | Furem et al. | |
| 8,315,802 B2 | 11/2012 | Brown | |
| 8,327,563 B2 | 12/2012 | Dingwall et al. | |
| 8,351,680 B2 | 1/2013 | Kalteis | |
| 8,373,078 B2 | 2/2013 | Madhavarao et al. | |
| 8,386,196 B2 | 2/2013 | Wagner et al. | |
| 8,405,721 B2 | 3/2013 | Bilandi et al. | |
| 8,406,963 B2 | 3/2013 | Farmer et al. | |
| 8,411,930 B2 | 4/2013 | Ridley et al. | |
| 8,431,283 B2 | 4/2013 | Owens et al. | |
| 8,437,921 B2 | 5/2013 | Paull | |
| 8,473,235 B2 | 6/2013 | Kittel et al. | |
| 8,504,255 B2 | 8/2013 | Colwell et al. | |
| 8,583,313 B2 | 11/2013 | Mian | |
| 8,738,304 B2 | 5/2014 | Hall et al. | |
| 8,738,342 B2 | 5/2014 | Lind et al. | |
| 8,775,099 B2 | 7/2014 | Wagner et al. | |
| 8,791,997 B2 | 7/2014 | Munkelt et al. | |
| 8,820,845 B2 | 9/2014 | Hall | |
| 8,833,861 B2 * | 9/2014 | Donnelli ................. G01P 15/00 |
| | | | 298/20 R |
| 8,843,279 B2 | 9/2014 | Tafazoli Bilandi et al. | |
| 8,872,643 B2 | 10/2014 | Ebert | |
| 8,872,818 B2 | 10/2014 | Freeman et al. | |
| 8,875,424 B2 | 11/2014 | Moller | |
| 8,890,672 B2 | 11/2014 | Miller | |
| 8,959,806 B2 | 2/2015 | Zamorano Jones | |
| 8,983,172 B2 | 3/2015 | Steffenson | |
| 8,990,672 B1 | 3/2015 | Grosz et al. | |
| 9,008,886 B2 | 4/2015 | Braunstein et al. | |
| 9,030,332 B2 | 5/2015 | Tafazoli Bilandi et al. | |
| 9,036,861 B2 | 5/2015 | Chen et al. | |
| 9,037,359 B2 | 5/2015 | Taylor et al. | |
| 9,145,741 B2 | 9/2015 | Trinh et al. | |
| 9,169,923 B2 | 10/2015 | Knisely | |
| 9,175,448 B2 | 11/2015 | Von Schoenebeck et al. | |
| 9,208,555 B1 | 12/2015 | Steiger et al. | |
| 9,222,243 B2 | 12/2015 | Cheyne et al. | |
| 9,234,422 B2 | 1/2016 | Hall | |
| 9,235,902 B2 | 1/2016 | Jahanshahi et al. | |
| 9,243,381 B2 | 1/2016 | Behmlander et al. | |
| 9,305,345 B2 | 4/2016 | Lim et al. | |
| 9,310,189 B2 | 4/2016 | Burgunder et al. | |
| 9,311,513 B2 | 4/2016 | Miller | |
| 9,355,346 B2 | 5/2016 | Butz | |
| 9,418,309 B2 | 8/2016 | Tafazoli Bilandi et al. | |
| 9,483,820 B2 | 11/2016 | Lim et al. | |
| 9,522,415 B2 | 12/2016 | Bamber et al. | |
| 9,567,725 B2 * | 2/2017 | Taylor ..................... E02F 3/439 |
| 9,611,625 B2 | 4/2017 | Koetz et al. | |
| 9,613,413 B2 | 4/2017 | Hasselbusch et al. | |
| 9,649,889 B2 | 5/2017 | Engel et al. | |
| 9,650,762 B2 | 5/2017 | Collins et al. | |
| 9,670,649 B2 | 6/2017 | Bewley et al. | |
| 9,714,923 B2 | 7/2017 | Behmlander et al. | |
| 10,008,095 B2 | 6/2018 | Reyes-Rodriguez et al. | |
| 10,190,289 B2 | 1/2019 | Reyes-Rodriguez et al. | |
| 10,767,347 B2 * | 9/2020 | Nishi ........................ E02F 9/26 |
| 2003/0227395 A1 * | 12/2003 | Zeineh ................. G08G 5/0013 |
| | | | 340/988 |

(56) References Cited

U.S. PATENT DOCUMENTS

| | | | |
|---|---|---|---|
| 2004/0044444 A1* | 3/2004 | Johnson | G05D 1/0055 244/175 |
| 2004/0227645 A1 | 11/2004 | Lujan et al. | |
| 2005/0027420 A1* | 2/2005 | Fujishima | E02F 9/2045 701/50 |
| 2005/0261799 A1* | 11/2005 | Groth | E02F 3/435 700/180 |
| 2006/0042734 A1 | 3/2006 | Turner et al. | |
| 2006/0243839 A9 | 11/2006 | Barscevicius et al. | |
| 2006/0265914 A1* | 11/2006 | Gudat | E02F 9/245 37/348 |
| 2007/0286474 A1 | 12/2007 | Dralle | |
| 2008/0047170 A1 | 2/2008 | Nichols | |
| 2008/0183344 A1* | 7/2008 | Doyen | G08G 5/0013 701/9 |
| 2009/0040307 A1* | 2/2009 | Rubin | B60R 11/04 348/E7.085 |
| 2009/0198409 A1 | 8/2009 | Rector et al. | |
| 2010/0096455 A1 | 4/2010 | Binmore | |
| 2010/0103260 A1 | 4/2010 | Williams | |
| 2010/0142759 A1* | 6/2010 | Ridley | E02F 9/2808 382/107 |
| 2010/0215212 A1 | 8/2010 | Flakes, Jr. | |
| 2011/0162241 A1 | 7/2011 | Wangsness | |
| 2011/0309935 A1 | 12/2011 | Emmett et al. | |
| 2011/0313625 A1 | 12/2011 | Miller et al. | |
| 2011/0317909 A1 | 12/2011 | Jeyaraman et al. | |
| 2012/0029732 A1* | 2/2012 | Meyer | A01B 69/008 701/2 |
| 2012/0043980 A1 | 2/2012 | Davies | |
| 2012/0098654 A1 | 4/2012 | Ebert | |
| 2012/0136630 A1 | 5/2012 | Murphy et al. | |
| 2012/0169876 A1 | 7/2012 | Reichert et al. | |
| 2012/0218411 A1 | 8/2012 | Wu et al. | |
| 2012/0262708 A1 | 10/2012 | Connolly | |
| 2012/0300059 A1 | 11/2012 | Stege | |
| 2013/0033164 A1 | 2/2013 | Shani | |
| 2013/0035875 A1 | 2/2013 | Hall et al. | |
| 2013/0082846 A1 | 4/2013 | McKinley et al. | |
| 2013/0147633 A1 | 6/2013 | Sumrall et al. | |
| 2013/0151170 A1 | 6/2013 | Uchida | |
| 2013/0233964 A1 | 9/2013 | Woodworth et al. | |
| 2014/0105481 A1 | 4/2014 | Hasselbusch et al. | |
| 2014/0125804 A1 | 5/2014 | Dammers | |
| 2014/0168420 A1 | 6/2014 | Naderhirn et al. | |
| 2014/0180914 A1* | 6/2014 | Abhyanker | G05D 1/102 705/332 |
| 2014/0212846 A1 | 7/2014 | Miller et al. | |
| 2014/0267731 A1* | 9/2014 | Izumikawa | B60R 1/00 348/148 |
| 2014/0324364 A1 | 10/2014 | Wagner et al. | |
| 2014/0327733 A1* | 11/2014 | Wagreich | H04N 23/698 348/37 |
| 2015/0013134 A1 | 1/2015 | Zenier et al. | |
| 2015/0035971 A1 | 2/2015 | Bogenschuetz | |
| 2015/0085123 A1 | 3/2015 | Tafazoli Bilandi et al. | |
| 2015/0107075 A1 | 4/2015 | Clarke et al. | |
| 2015/0149027 A1 | 5/2015 | Paulsen et al. | |
| 2015/0192526 A1 | 7/2015 | Nissen et al. | |
| 2015/0254988 A1* | 9/2015 | Wang | G08G 5/0052 701/3 |
| 2015/0284935 A1 | 10/2015 | Egger et al. | |
| 2015/0317787 A1 | 11/2015 | Badawy et al. | |
| 2015/0322634 A1 | 11/2015 | Stock et al. | |
| 2015/0337522 A1 | 11/2015 | Diekevers et al. | |
| 2015/0371243 A1 | 12/2015 | Ramaswamy et al. | |
| 2016/0109608 A1 | 4/2016 | Branson | |
| 2016/0178483 A1* | 6/2016 | Sidles | E02F 9/26 73/146 |
| 2016/0194850 A1* | 7/2016 | Taylor | E02F 7/04 701/50 |
| 2016/0221618 A1 | 8/2016 | Sidles | |
| 2016/0237640 A1* | 8/2016 | Carpenter | E02F 9/2833 |
| 2016/0291589 A1* | 10/2016 | Ashoori | G05D 1/106 |
| 2016/0299091 A1 | 10/2016 | Bamber et al. | |
| 2016/0371984 A1* | 12/2016 | Macfarlane | G06V 20/176 |
| 2016/0376771 A1* | 12/2016 | Behmlander | E02F 9/26 37/453 |
| 2017/0076610 A1* | 3/2017 | Liu | G08G 5/0026 |
| 2017/0175363 A1* | 6/2017 | Clarke | G05D 1/0094 |
| 2017/0254051 A1 | 9/2017 | Hassanein et al. | |
| 2018/0293901 A1* | 10/2018 | Chen | G08G 5/0082 |
| 2018/0371723 A1* | 12/2018 | Nishi | H04N 7/181 |
| 2019/0010680 A1 | 1/2019 | Hills et al. | |
| 2019/0114925 A1* | 4/2019 | Schulman | G08G 5/0082 |
| 2019/0338497 A1 | 11/2019 | Espejo Pina et al. | |

FOREIGN PATENT DOCUMENTS

| | | | |
|---|---|---|---|
| AU | 2009200658 A1 | 9/2009 | |
| AU | 2012215112 | 8/2013 | |
| AU | 2014254370 | 10/2014 | |
| AU | 2014254370 A1 * | 11/2015 | ............ E02F 3/7604 |
| AU | 2013304355 | 12/2016 | |
| AU | 2014254370 B2 * | 7/2018 | ............ E02F 3/7604 |
| CA | 2274543 | 6/1998 | |
| CA | 2880927 | 2/2014 | |
| CA | 2993410 | 2/2017 | |
| CN | 2913706 | 6/2007 | |
| CN | 102183955 A * | 9/2011 | |
| CN | 102184646 B * | 3/2013 | |
| CN | 202809691 | 3/2013 | |
| CN | 104006743 A * | 8/2014 | |
| CN | 204001039 | 12/2014 | |
| CN | 103869822 B * | 9/2016 | |
| DE | 3023729 A * | 1/1982 | ............... E02F 3/26 |
| DE | 3023729 C2 | 11/1983 | |
| DE | 3509279 A * | 9/1986 | ............ G01L 5/0004 |
| DE | 3509279 C2 | 9/1990 | |
| DE | 102009035280 A1 * | 2/2011 | ............ A01C 17/008 |
| EP | 1414002 | 4/2004 | |
| EP | 2402740 | 1/2012 | |
| EP | 2161375 | 7/2014 | |
| EP | 2921995 | 9/2015 | |
| EP | 3256650 A1 * | 12/2017 | ............ B64C 39/024 |
| EP | 3256650 A4 * | 2/2019 | ............ B64C 39/024 |
| FR | 2977681 | 1/2013 | |
| GB | 1487939 | 10/1977 | |
| JP | S62202131 | 9/1987 | |
| JP | 07-42201 | 2/1995 | |
| JP | 9-72180 | 3/1997 | |
| JP | 09072180 A * | 3/1997 | |
| JP | 11-130270 | 5/1999 | |
| JP | 2003238093 A * | 8/2003 | |
| JP | 2006160423 A * | 6/2006 | |
| JP | 3872699 B2 * | 1/2007 | |
| JP | 2007-120110 | 5/2007 | |
| JP | 2007279308 A * | 10/2007 | |
| JP | 2007-327334 | 12/2007 | |
| JP | 4227798 B2 * | 2/2009 | |
| JP | 2010-89633 | 4/2010 | |
| JP | 2011085849 A * | 4/2011 | ............ E02F 9/0858 |
| JP | 2012096859 A * | 5/2012 | |
| KR | 20050018773 | 2/2005 | |
| KR | 20160063454 | 6/2016 | |
| KR | 101806488 | 12/2017 | |
| RU | 2274543 | 4/2006 | |
| RU | 107986 | 9/2011 | |
| RU | 174996 | 11/2017 | |
| SU | 132140 | 11/1959 | |
| SU | 174996 | 9/1965 | |
| SU | 781281 | 11/1980 | |
| SU | 1254308 | 8/1986 | |
| WO | WO 2003/035989 | 5/2003 | |
| WO | WO 2006/128258 | 12/2006 | |
| WO | WO 2007/149295 | 12/2007 | |
| WO | WO 2012/107484 | 8/2012 | |
| WO | WO 2012/112587 | 8/2012 | |
| WO | WO-2012107848 A1 * | 8/2012 | ............... E02F 9/24 |
| WO | WO 2012/116408 | 9/2012 | |
| WO | WO 2013/009952 | 1/2013 | |
| WO | WO 2013/033164 | 3/2013 | |
| WO | WO-2013040633 A1 * | 3/2013 | ............ E02F 9/2054 |

(56) References Cited

FOREIGN PATENT DOCUMENTS

| WO | WO-2013049513 A1 | * | 4/2013 | ............... G07C 3/08 |
|---|---|---|---|---|
| WO | WO 2014/026742 | | 2/2014 | |
| WO | WO-2014172116 A1 | * | 10/2014 | ............ E02F 3/7604 |
| WO | WO 2016/008059 | | 1/2016 | |
| WO | WO 2016/131015 | | 8/2016 | |
| WO | WO-2016131007 A1 | * | 8/2016 | ........... B64C 39/024 |
| WO | WO 2017/017289 | | 2/2017 | |
| WO | WO 2018/095536 | | 5/2018 | |
| WO | WO-2020007958 A1 | * | 1/2020 | ................ E02F 9/26 |

OTHER PUBLICATIONS

Abdallah Alma'aitah, et al., "Utilizing Sprouts WSN Platform for Equipment Detection and Localization in Harsh Environments", School of Computing, Queen's University, Kingston, Ontario, Canada, 2014, 7 pages.
PCT/US2016/017896—Written Opinion dated Aug. 24, 2017.
AU201426221 Opposition, Netarus, LLC, "HoistCam", https://www.youtube.com/watch?v=GkIHymxZpX8m, Oct. 2, 2013.
AU201426221 Opposition, Vision Systems Design, Vision system detects missing shovel teeth, https://www.vision-systems.com/cameras-accessories/article/16739047/vision-sys.
AU201426221 Opposition, MRO Magazine, "Can You Dig It?", https://www.mromagazine.com/2011/12/18/can-you-dig-it-advanced-shovel-monitoring-systems-reduce-downtime/, Decembe.
AU201426221 Opposition, Canadian Mining Journal, Bucket Tooth Loss—Money-saving Canadian-made solution, http://www.canadianminingjournal.com/news/bucket-tooth-loss-mone.
Loadrite: On Board Weighing Systems for Escavators, www.loadrites.cales.com, pp. 1-6, (2012).
AU201426221 Opposition Declaration of Rodney Keith Clarke, Mar. 21, 2019.
AU201426221 Opposition Declaration of Hezekiah Russel Holland, Apr. 5, 2019.
AU201426221 Opposition Statement of Grounds and Particulars.
AU201426221 Opposition Statutory Declaration of Rebecca Dutkowski, Mar. 21, 2019.
AU201426221 Opposition: 1st Hillier Declaration in Support of Opposition Exhibits, Dec. 11, 2018.
AU201426221 Opposition: 1st Hillier Declaration in Support of Opposition, Dec. 11, 2018.
AU201426221 Opposition: 2nd Hillier Declaration in Support of Opposition Exhibits, Dec. 20, 2018.
AU201426221 Opposition: 2nd Hillier Declaration in Support of Opposition, Dec. 20, 2018.
AU201426221 Opposition: 3rd Hillier Declaration in Support of Opposition Exhibits, Jun. 10, 2019.
AU201426221 Opposition: 3rd Hillier Declaration in Support of Opposition, Jun. 10, 2019.
AU201426221 Opposition, Luo Xiujuan et al.Missing Tooth Detection with Laser Range Sensing, Proceedings of the 5th World Congress on Intelligent Control of Automation.
Lim et al., "Tooth Guard: A Vision System for Detecting Missing Tooth in Rope Mine Shovel", https://jvbsoares.files.wordpress.com/2016/03/tooth_guard_wacv_2016.pdf.
PCT/2014/067198—Written Opinion dated Apr. 9, 2015.
"Vision Sensors for the Detection of Rail Wear Zones on Train Cars", SICKINSIGHT, http://www.sickinsight-online.com/vision-sensors-for-the-detection-of-rail-wear-zones-on-trai.
Trimble, "Trimble Loadrite X2350 Excavator Scales", www.trimble.com, Westminster, CO., 2013.
Trimble, "Yield Monitoring", www.trimble.com, http://www.trimble.com/Agriculture/yield-monitoring.aspx, Nov. 7, 2014.
Riegl, "Mobile Laser Scanning", www.riegl.com, http://www.riegl.com/nc/products/mobile-scanning/, Oct. 2, 2014.
Stephen Se et al., "Stereo-Vision Based 3D Modeling and Localization for Unmanned Vehicles", Intl J. of Intelligent Control & Systems, vol. 13, No. 1, pp. 47-58, Mar. 2008.
Trimble, "Applications and Markets", www.trimble.com, http://uas.trimble.com/applicants-and-markets, Oct. 2, 2014.
Trimble, "Installation Instructions: Trimble Yield Monitoring System", www.trimble.com, Version 2.00, Revision A, Westminster, CO., Dec. 2012.

\* cited by examiner

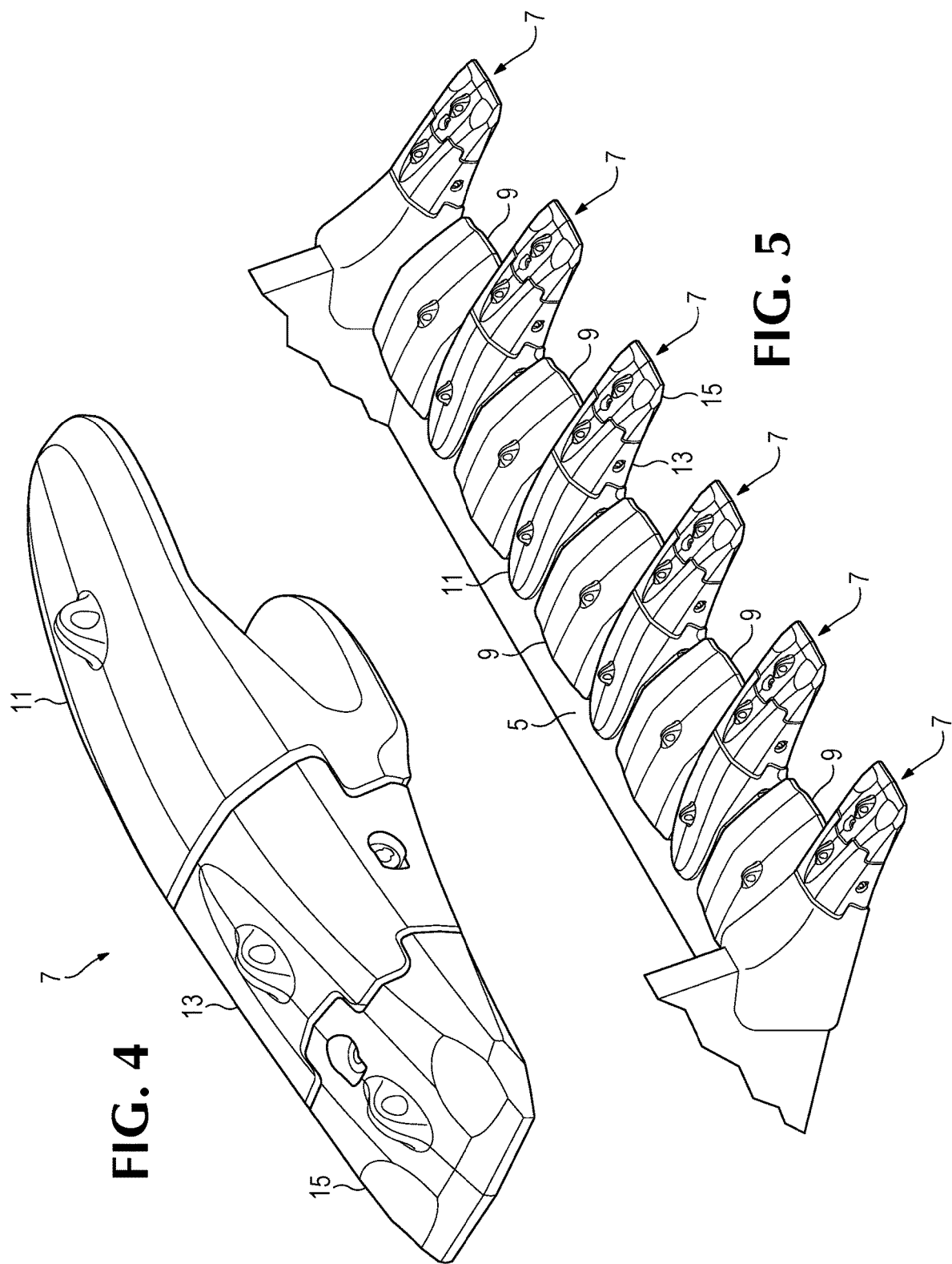

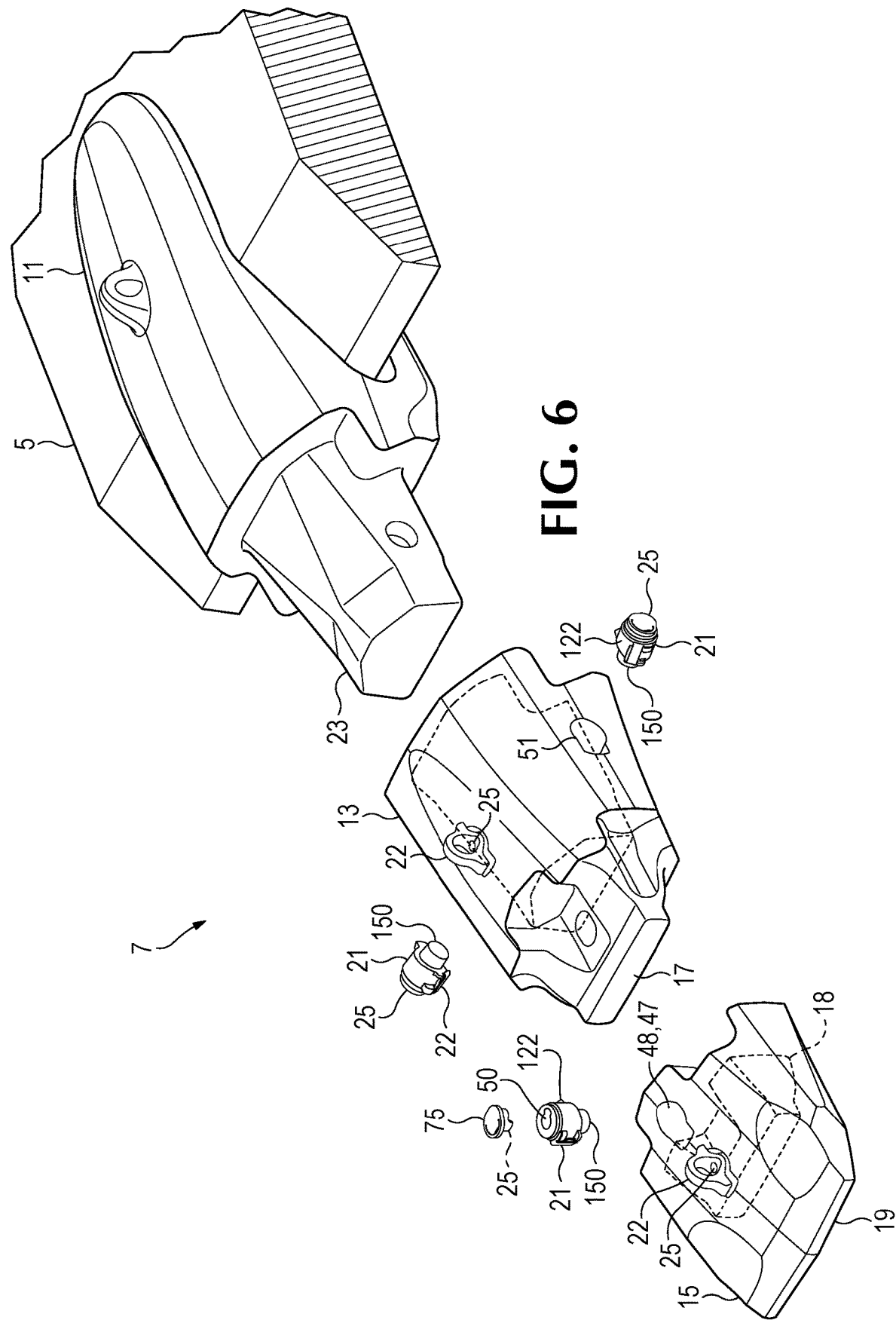

MONITORING GROUND-ENGAGING PRODUCTS FOR EARTH WORKING EQUIPMENT

RELATED APPLICATIONS

This application claims priority benefits to U.S. Provisional Patent Application No. 62/116,216 filed Feb. 13, 2015 and entitled "Wear Part Monitoring," U.S. Provisional Patent Application No. 62/151,124 filed Apr. 22, 2015 and entitled "Wear Part Monitoring," U.S. Provisional Patent Application No. 62/175,109 filed Jun. 12, 2015 and entitled "Wear Part Monitoring," U.S. Provisional Patent Application No. 62/198,552 filed Jul. 29, 2015 and entitled "Wear Part Monitoring," and U.S. Provisional Patent Application No. 62/234,463 filed Sep. 29, 2015 and entitled "Monitoring for Earth Working Equipment," each of which is incorporated herein by reference in its entirety.

FIELD OF THE INVENTION

The present invention pertains to a system and tool for monitoring characteristics such as part identification, presence, condition, usage, and performance of ground-engaging products used on various kinds of earth working equipment.

BACKGROUND OF THE INVENTION

In various kinds of earth working activities (e.g., mining, construction, dredging, etc.), ground-engaging products (e.g., teeth, shrouds, and lips) are commonly provided on earth working equipment to protect the underlying equipment from undue wear and, in some cases, perform other functions such as breaking up the ground ahead of a digging edge. For example, excavating buckets are typically provided with multiple wear components such as excavating teeth and shrouds that are attached to the lip of the bucket. It is common for a tooth to include an adapter secured to the lip of a bucket, and a wear member attached to the adapter to initiate contact with the ground and break up the ground ahead of the digging edge.

During use, such ground-engaging products can encounter heavy loading and highly abrasive conditions. These conditions can cause the products to become separated from the earth working equipment. For example, as a bucket engages the ground, a point or adapter may become separated from the digging edge. The operators of the earth working equipment may not always be able to see when such products have separated from the bucket. Continuing to operate the earth working equipment with missing products (such as wear parts) can lead to a decrease in production and excessive wear on other components on the earth working equipment. It is also well known that a lost wear part in a mining environment may cause damage to downstream equipment (e.g., conveyors, screens, pumps, crushers, etc.), which may, in turn, for example, lead to unscheduled downtime of the equipment and loss of production. If a wear part becomes caught in a crusher, the wear part may be ejected and cause a hazard to workers or it may be jammed and require an operator to dislodge the part, which at times may be a difficult, time-consuming and/or hazardous process.

The abrasive environment associated with digging and other earth working activities also causes the ground-engaging products to wear and eventually become worn out. Excessive wearing can result in breakage and/or loss of the products during use as well as decreased production, greater costs in fuel consumption, etc.

Systems with varying degrees of success have been used to monitor when ground-engaging products become worn, damaged or separated, and in need of replacement. For example, the Tooth-Wear Monitoring system and Missing Tooth Detection system sold by Motion Metrics uses an optical camera mounted on the boom of excavating equipment. Similarly, U.S. Pat. No. 8,411,930 discloses a system for detecting damaged or missing wear parts using a video camera mounted on the boom.

Other systems with varying degrees of success have been used to monitor if a wear part is secured to an excavating machine. For example, mechanical systems have been fixed between the wear part and a base upon which it is mounted for detecting the absence of the wear part. In U.S. Pat. No. 6,870,485, the system contains a spring loaded switch between the point and adapter of a tooth. When the components are separated, an electrical switch activates a radio transmitter alerting the operator that the wear part has been lost. In U.S. Pat. No. 5,743,031, the system comprises an actuator attached between the tooth and the nose. In one example, the actuator actuates a smoke canister to provide a visual signal that the tooth has fallen off. These systems are limited in that they only monitor loss of a wear part. Further, these mechanical systems can be costly and cumbersome to install when a wear member is worn and needs replacement.

SUMMARY OF THE INVENTION

The present invention pertains to a system and tool for monitoring ground-engaging products for earth working equipment. The monitoring tool can monitor characteristics such as part identification, presence, condition, usage, and/or performance of ground-engaging products on earth working equipment used, for example, in mining, construction, and dredging environments.

In one aspect of the invention, the monitoring tool includes or is supported by a mobile device that is remote from the earth working equipment. Supporting the monitoring tool on a mobile device can, e.g., provide unique vantage points to monitor the earth working equipment products, monitor the products without inhibiting the operation of the earth working equipment or endangering personnel, closely approach areas of interest for secure and reliable gathering of information, monitor multiple earth working equipment, and/or be protected from the vibrations and impact shocks that can be associated with earth working equipment.

In one embodiment, the monitoring tool includes a surface characterization device (e.g., a camera, 3D laser device, LiDAR device, and/or photogrammetry device) supported by the mobile device to monitor characteristics of at least one product on earth working equipment. The mobile device can be, e.g., a mobile vehicle or handheld device.

In another aspect of the invention, programmable logic is used to process information obtained by the monitoring device to remotely monitor at least one ground-engaging product on earth working equipment to determine a characteristic of the product. As one example, the current wear profile of the product can be determined and, based on that wear profile, the programmable logic can determine the remaining wear life of the product. In one embodiment, the programmable logic compares the current wear profile with a previously recorded wear profile and/or a minimum wear profile to determine the remaining wear life. As examples, the remaining wear life can be given as a unit of time or a unit of remaining digging cycles. In one other embodiment, a monitoring tool generates a data set that allows the programmable logic to create, e.g., a two or three dimensional wear profile of the product. Monitoring such products and predicting the remaining wear life allows the products to be replaced prior to reaching a wear profile that would damage the underlying parts and/or decrease production.

In another aspect of the invention, the monitoring tool for monitoring ground-engaging products for earth working equipment includes a mobile vehicle that is movable independently of the earth working equipment. As examples, the mobile vehicle can be an unmanned aerial vehicle (UAV), remotely operated vehicle (ROV), ground based mobile vehicle robot, or service vehicle.

In another aspect of the invention, the monitoring system includes an electronic device remote to the monitoring tool. In various embodiments, the remote device(s) can be located on a wear part, the earth working equipment, other related equipment and/or a standalone support. The information from the remote device can, e.g., be used in determining characteristics of the ground-engaging product or earth working equipment, function as part of an obstacle avoidance system for the tool, and/or real-time assessments of operations. As examples, the remote device can provide information on material to be mined, location of products to use, etc.

In another aspect of the invention, a method for monitoring ground-engaging products on earth working equipment comprises maneuvering a tool to the earth working equipment, generating a current wear profile of the product being monitored from information gathered by a monitoring tool and/or remote device, and comparing the current wear profile to a wear profile database to determine an amount of wear life that the product has remaining. The current wear profile can, e.g., be a two or three dimensional profile of the product but could be determined in other ways.

In another aspect of the invention, a monitoring tool monitors performance such as the amount of material in a ground-engaging product, e.g., a bucket or truck tray. In one embodiment, the tool can determine the amount of collected material by generating, e.g., a two or three dimensional profile of the load. As examples, the system can provide an approximate weight of the load based on such things as mine geology, the degree of fragmentation of the material, and/or the volume of the material within the earth working equipment. In other examples, the system may receive information from a remote device on the earth working equipment, e.g., to validate the weight of the load within the earth working equipment.

In another aspect of the invention, the monitoring tool and/or remote device may reference information (e.g., wear profiles) in a database. As examples, the wear profile information may be of new product, partially worn products, and/or a fully worn product. The wear profile information of the product may be a representation of the product. The representation of the product may be, for example, a two or three dimensional CAD file or a two or three dimensional point cloud representation of the product. Such representations of the products may be preloaded into a database associated with a remote device or the monitoring tool. The tool for monitoring the products also may include stored data to generate, e.g., a two or three dimensional representation. Programmable logic may add the generated representation of the product to a wear profile database. A wear profile database is able to be populated with a variety of wear conditions for a variety of ground-engaging products used on a variety of earth working equipment regardless of the manufacturer.

In another aspect of the invention, a method for monitoring a ground-engaging product on earth working equipment comprises maneuvering a tool to the earth working equipment, generating a current wear profile of the product being monitored, comparing the current wear profile to a wear profile database, and referencing, e.g., a global positioning system (GPS) information and/or a database of other data, e.g., mine geology, fragmentation, etc. to determine the products' wear rate.

In another aspect of the invention, a method for monitoring characteristics of ground-engaging products (e.g., load, digging rate, etc.) comprises monitoring with an aerial vehicle such as a UAV. In one example, the aerial vehicle monitoring tool gathers information to determine characteristics of the product. As an example, the tool can generate, e.g., a two or three dimensional profile of a load in, e.g., a bucket or truck tray, determine the amount of gathered material, store the results, repeat the process to historically track the loads, analyze the historical data to determine such things as the fill rate of the earth working products, the cycle time between loads, the number of fill cycles, and/or the earth working equipment's effectiveness and/or production.

In another aspect of the invention, a UAV tool is used to monitor ground-engaging products for, e.g., improved viewpoint without additional safety hazards to operators. As examples, the UAV tool can monitor wear on the products of a bucket, a load in the bucket and/or a load in a truck body receiving earthen material from the bucket. A UAV tool can also concurrently monitor multiple products including products on multiple earth working equipment.

In another aspect of the invention, a monitoring tool can monitor characteristics of a ground-engaging product(s) for an earth working operation to determine such things as suggesting a digging path to increase productivity. In another example, the tool can be used to determine the bucket's optimal digging path so that the earth working equipment and/or an operator uses the information from the monitoring tool to adjust the bucket's digging path using historically gathered information and/or real-time assessment of the information gathered by the tool and/or remote device(s). In another example, the tool provides the operator the bucket's optimal digging path so that the operator uses the information from the monitoring tool to adjust the bucket's digging path.

In another aspect of the invention, the characteristics of ground-engaging products on a plurality of earth working equipment can be concurrently monitored by a single tool. In one example, the load gathered in a digging bucket and the load gathered in a truck body being filled by the bucket can be concurrently monitored by a single tool.

In another aspect of the invention, a monitoring tool can provide real-time assessment of characteristics of ground engaging products. For example, the tool can monitor the load gathered in a bucket and in the truck tray being filled to provide information to the operator on more efficiently filling the truck tray.

In another aspect of the invention, a monitoring tool can be used to generate data usable to map a mine site or other earth working site to estimate characteristics of the ground-engaging products on earth working equipment used at the site. For example, the gathered data could be used to generate contour-style mapping of wear rates for ground-engaging products to, e.g., better determine such things as product replacement schedules, costs, etc. The data could be used to map other characteristics or process the site data in ways other than mapping to generate similar information.

The various above-noted aspects and embodiments are usable together or independently. To gain an improved understanding of the advantages and features of the invention, reference may be made to the following descriptive matter and accompanying figures that describe and illustrate various configurations and concepts related to the invention.

BRIEF DESCRIPTION OF THE DRAWINGS

FIG. 4 is a perspective view of one of the tooth assemblies shown in FIG. 2.

FIG. 5 is a perspective view of the digging edge of the bucket in FIG. 2.

FIG. 6 is an exploded perspective view of the tooth assembly shown in FIG. 5.

DETAILED DESCRIPTION OF PREFERRED EMBODIMENTS

Figure 1:
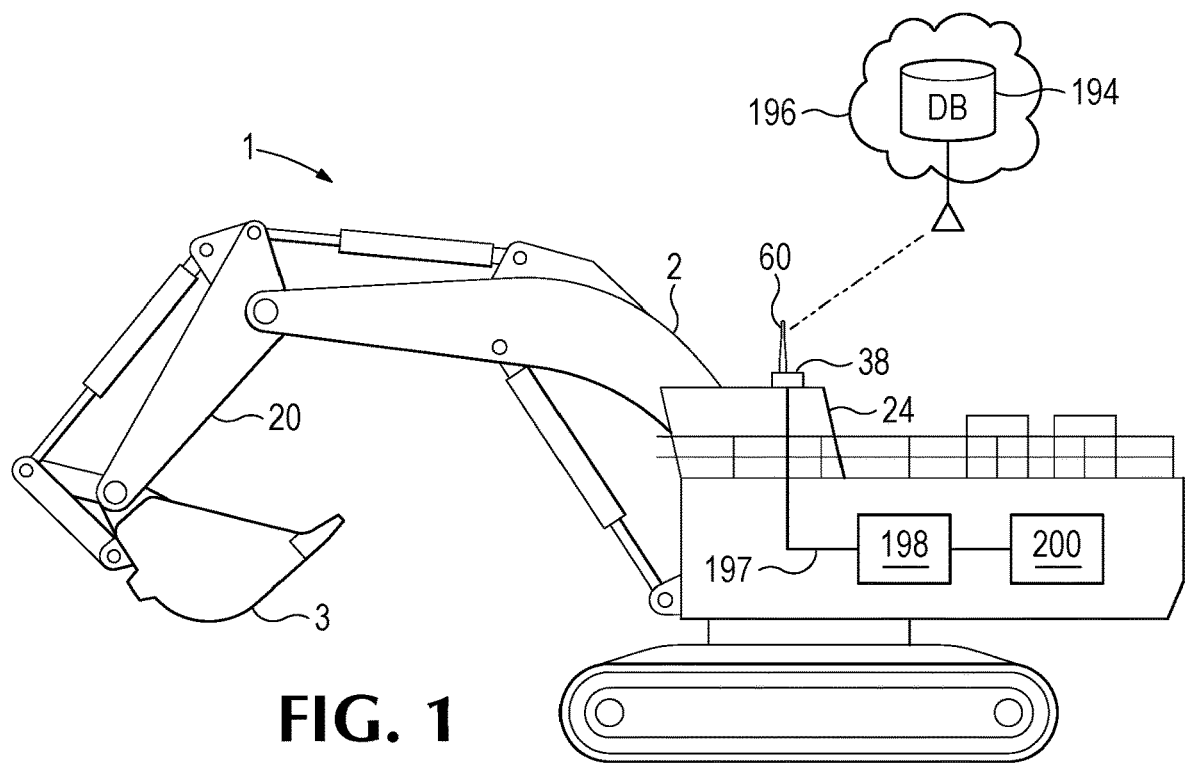
FIG. 1 is a side view of a first example earth working machine.

The present invention pertains to a system and tool for monitoring characteristics of ground-engaging products on earth working equipment such as part identification, presence, usage, condition, and/or performance of products. The earth working equipment can be, for example, excavating equipment and/or ground conveying equipment.

Information related to part identification can include such things as product type, product number, customer number, brand name, trademark, bill of material, maintenance instructions, use instructions, etc. Information related to usage can include such things as the type of earth working equipment associated with the product, number of digging cycles, average time of digging cycles, location of the product on the equipment, etc. Information related to condition of the product can include such things as wear, damage, etc. Information related to performance can include such things as the rate of digging, tons moved per each increment of wear, fill rates, etc. These characteristics could be determined using data generated by the monitoring tool alone or in combination with other information in a remote device database and/or gathered by a remote device. As examples, additional information may include mine geology, fragmentation information, machines in use, etc. The system can be used to determine such things as timetables for excavating certain material, replacement schedules for products, etc. Tools 25 can also be used to detect product loss (i.e., presence). These monitored characteristics are given as examples only and are not intended to be limiting.

Excavating equipment is intended as a general term to refer to any of a variety of excavating machines used in mining, construction and other activities, and which, for example, include dozers, loaders, dragline machines, cable shovels, face shovels, hydraulic excavators, continuous miners, road headers, shear drums and dredge cutters. Excavating equipment also refers to the ground-engaging products of this equipment such as the bucket, blade, drum, or cutter head. Ground conveying equipment is also intended as a general term to refer to a variety of equipment that is used to convey earthen material and which, for example, includes chutes and haul trucks. Ground conveying equipment also refers to the ground-engaging products for this equipment including, e.g., liners and truck trays (also known as truck bodies).

Relative terms such as front, rear, top, bottom and the like are used for convenience of discussion. The terms front or forward are generally used (unless otherwise stated) to indicate the usual direction of travel of the earthen material relative to the product during use (e.g., while digging), and upper or top are generally used as a reference to the surface over which the material passes when, for example, it is gathered into the bucket. Nevertheless, it is recognized that in the operation of various earth working machines, the ground-engaging products may be oriented in various ways and move in all kinds of directions during use.

Figure 2:
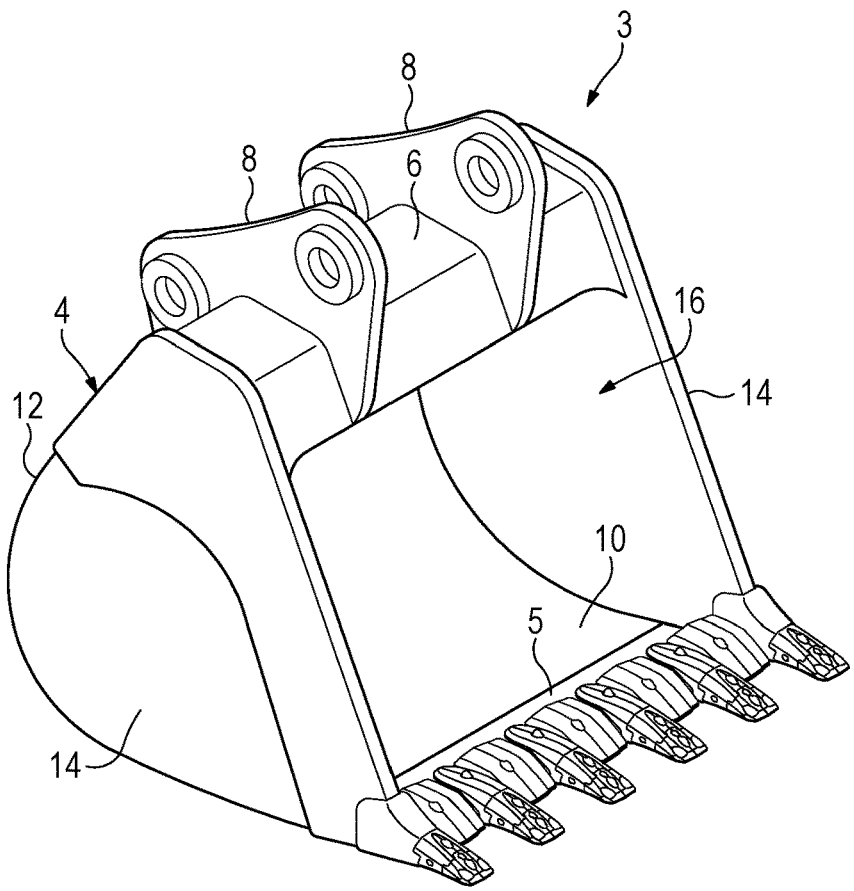
FIG. 2 is a perspective view of a lip of a bucket with teeth and shrouds.
Figure 3:
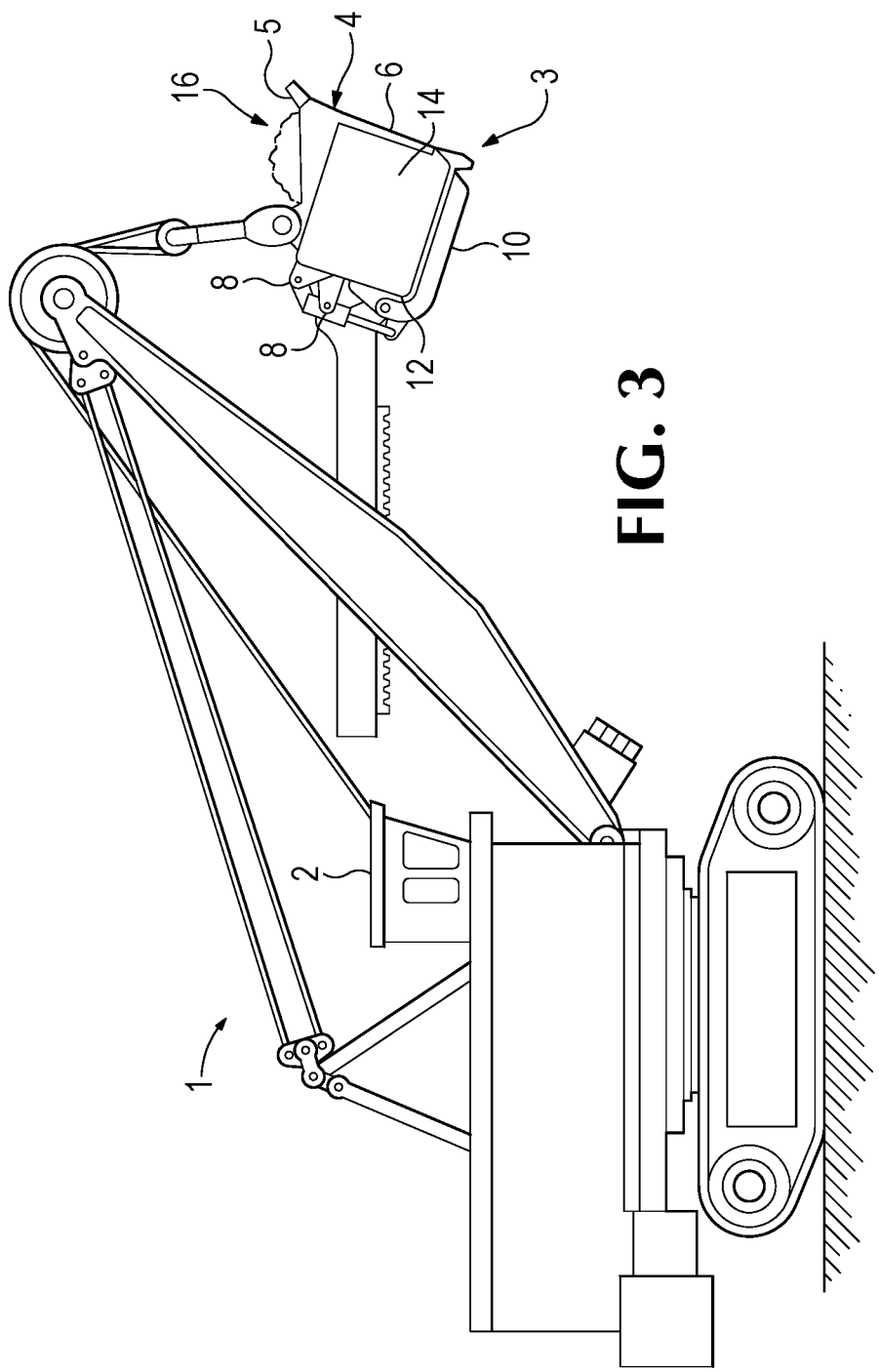
FIG. 3 is a side view of a second example earth working machine.

In one embodiment, earth working equipment 1, such as a mining excavator 1, may be equipped with a bucket 3 for gathering earthen material while digging (FIG. 1). The bucket 3 includes a frame or shell 4 defining a cavity 16 for gathering material during the digging operation (FIG. 2). Shell 4 includes a rear wall 12 having attachment supports 8 to attach the bucket 3 to earth working equipment 1, and a pair of opposing sidewalls 14 located to each side of rear wall 12. Multiple configurations of buckets are known and variations in bucket geometry exist. For example, the bucket may have a hinged bottom door 10 such as in a cable shovel (FIG. 3). Other examples include a bucket without a top wall as in a dragline bucket, or a bucket wherein a portion of the side walls may be hinged as in a hydraulic face shovel. The specific geometry of the bucket is not intended to be limiting as the present invention can be used with various types of buckets and with various types of wear parts, attachments, and components used on earth working equipment.

The bucket 3 has a lip 5 that defines a digging edge of the bucket 3 (FIGS. 2, 3 and 5). The digging edge is that portion of the equipment that leads the contact with the ground. Tooth assemblies and shrouds are often secured to the digging edge to protect the edge, break up the ground ahead of the lip 5, and gather material into the bucket. Multiple tooth assemblies 7 and shrouds 9, such as disclosed in U.S. Pat. No. 9,222,243, which is incorporated herein by reference in its entirety, may be attached to lip 5 of bucket 3 (FIGS. 1-5). The illustrated tooth 7 includes an adapter 11 welded to lip 5, an intermediate adapter 13 mounted on adapter 11, and a point (also called a tip) 15 mounted on base 13. Point 15 includes a rearwardly-opening cavity 18 to receive nose 17 of base 13, and a front end 19 to penetrate the ground (FIG. 6). Securement mechanisms or locks 21 are used to secure wear member 15 to base 13, and base 13 to nose 23 (FIG. 6). Other tooth arrangements are possible, such as disclosed in U.S. Pat. No. 7,882,649, which is incorporated herein by reference. One aspect of the present invention pertains to monitoring characteristics such as the presence, part identification, usage, performance and/or condition of a ground-engaging product associated with earth working equipment.

For ease of discussion, the application generally discusses monitoring a wear part on a base secured to an excavating bucket. However, the tool or system could be used to monitor other products, characteristics, operations and/or earth working equipment. As examples, tool 25 may monitor a point on an adapter, a point 15 on an intermediate adapter 13, an intermediate adapter on an adapter, an adapter on a digging edge, a nose 15 of a cast lip, a shroud on a lip 5, a lip on a bucket 3, a blade on a mold board, a wear runner or liner on a bucket, chute or truck tray, a truck tray on a haul truck, teeth on a cutter head, picks on a shear drum, wear plate affixed to bucket, a bucket on a boom, or other ground-engaging products on other kinds of earth working equipment.

In accordance with an example of a tooth, the point will generally wear out and need to be replaced a number of times. The intermediate adapter may be referred to as a base for this wear part. However, the intermediate adapter may also be referred to as a wear part or ground-engaging product to be monitored. When such a ground-engaging product reaches a minimum recommended wear profile (i.e., the wear member is considered fully worn), the product 15 is replaced so that production does not decrease and the base, upon which the product mounts, does not experience unnecessary wear.

In accordance with the invention, a monitoring tool 25 is provided for monitoring ground-engaging products 15 on earth working equipment such as bucket 3. The tool 25 is separate from the earth working equipment 1 and is preferably movable. Keeping the tool 25 separate from the earth working equipment protects it from vibrations and impact shocks associated with the earth working equipment. The ability to move the tool 25 allows the tool to, e.g., improve its ability to monitor the ground-engaging products, and/or monitor more than one product or earth working equipment (FIGS. 7 and 8).

The Tooth-Wear Monitoring system and Missing Tooth Detection system sold by Motion Metrics uses an optical camera mounted on the boom of excavating equipment. Similarly, U.S. Pat. No. 8,411,930 discloses a system for detecting damaged or missing wear parts using a video camera mounted on the boom. Because the cameras are located on the boom, the systems only have a clear view of the wear parts during a portion of the digging and dumping operation. As a result, there is potential for the systems to not immediately register that a wear part has been lost or needs replacement. The systems may have to wait until the next digging and dumping cycle to confirm that the wear part is truly lost, and that an object is not obstructing the system's view and registering a false alarm. Mounting on the boom can also subject the camera to vibration and/or impact shock, which can lead to faulty and unreliable readings (i.e., false alarms and lack of a needed alert), and camera damage or wear leading to a reduced usable life for the system. Mounting a camera on the boom also limits the closeness of a viewpoint that can be achieved, and limites when routine or unscheduled maintenance can be done on the camera and/or system The monitoring tool 25 is or is supported by a mobile device such as a mobile vehicle 27 (e.g., a UAV, ROV, robot, service vehicle or the like) or a handheld device (e.g., a mobile phone, tablet or the like). In one construction, the tool 25 is a UAV in the form of, e.g., a drone, helicopter, blimp, airplane, or other aerial vehicle. The mobile vehicle 27 may be maneuvered directly by an operator, remotely by an operator via a user input device or autonomously. As examples, the mobile vehicle may be maneuvered with a joystick, autonomous, or a combination of control by operator and by programming. For example, a UAV may require an operator for takeoff and landing and may automatically hover in place above the earth working equipment automatically. There are a number of off-the-shelf UAVs, ground based mobile robot, and ROVs that could be modified to monitor ground-engaging products. For example, the UAV may be a hover drone sold by Adam Technology under the name A.I. Tech, a hover drone sold by AIBOTIX under the name Aibot X6 V2, an airplane sold by Trimble under the name UX5, a hover drone sold by infinite jib inc. under the name The Surveyor and/or ORION, a hover drone sold by SwissDrones Operating AG under the name Dragon 50, a hover drone sold by 3D Robotics Inc. under the name 3DR RTF X8, a hover drone sold by DJI under the name Phantom, a hover aircraft sold by RIEGL under the name RIEGL RiCOPTER, and/or any of the numerous other UAVs, ground based mobile robot, and ROVs currently known.

Figure 7:
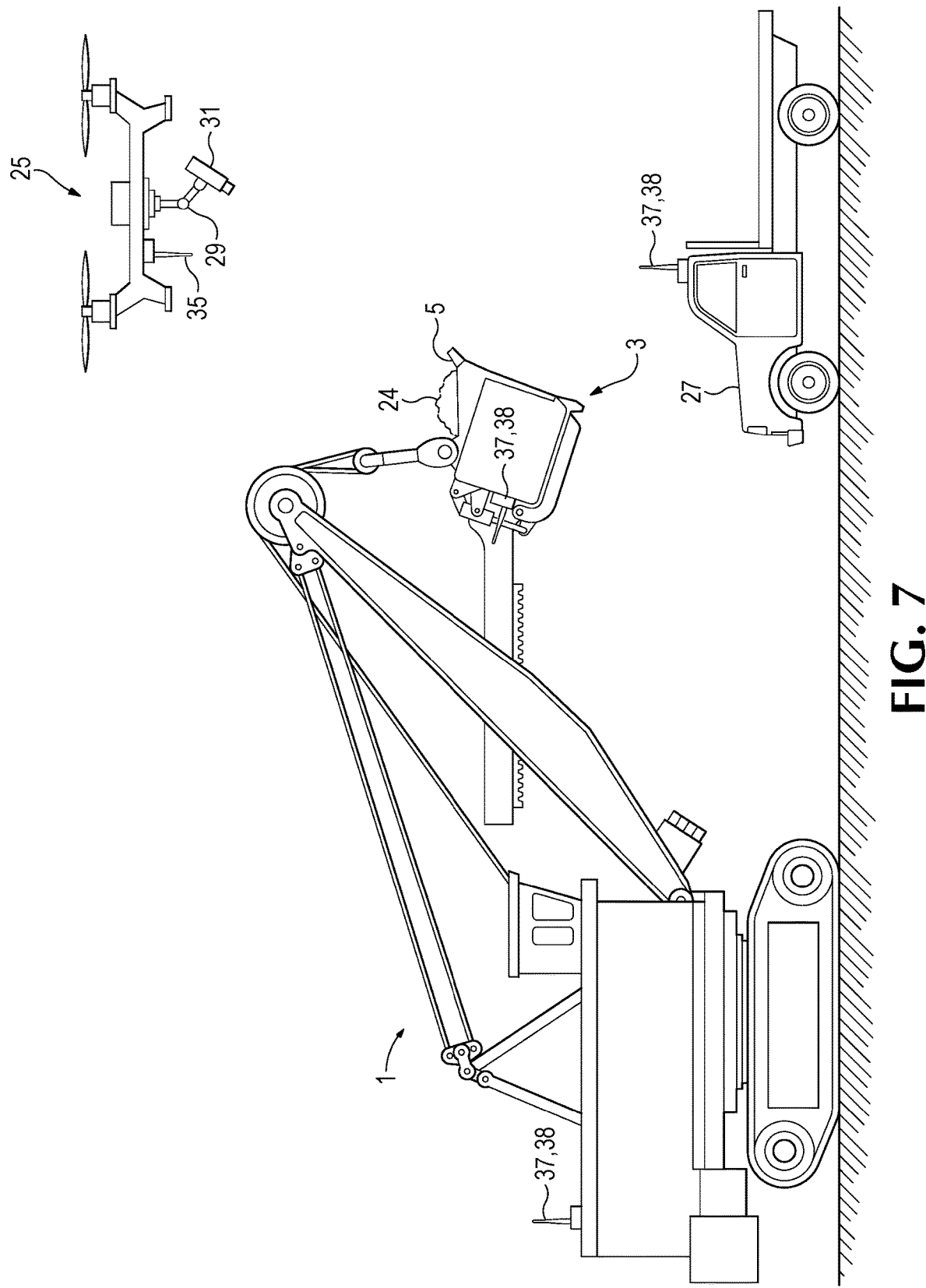
FIG. 7 illustrates a first example of a tool and its use in accordance with the present invention, i.e., where the tool is an airborne device used to monitor products on earth working equipment.
Figure 8:
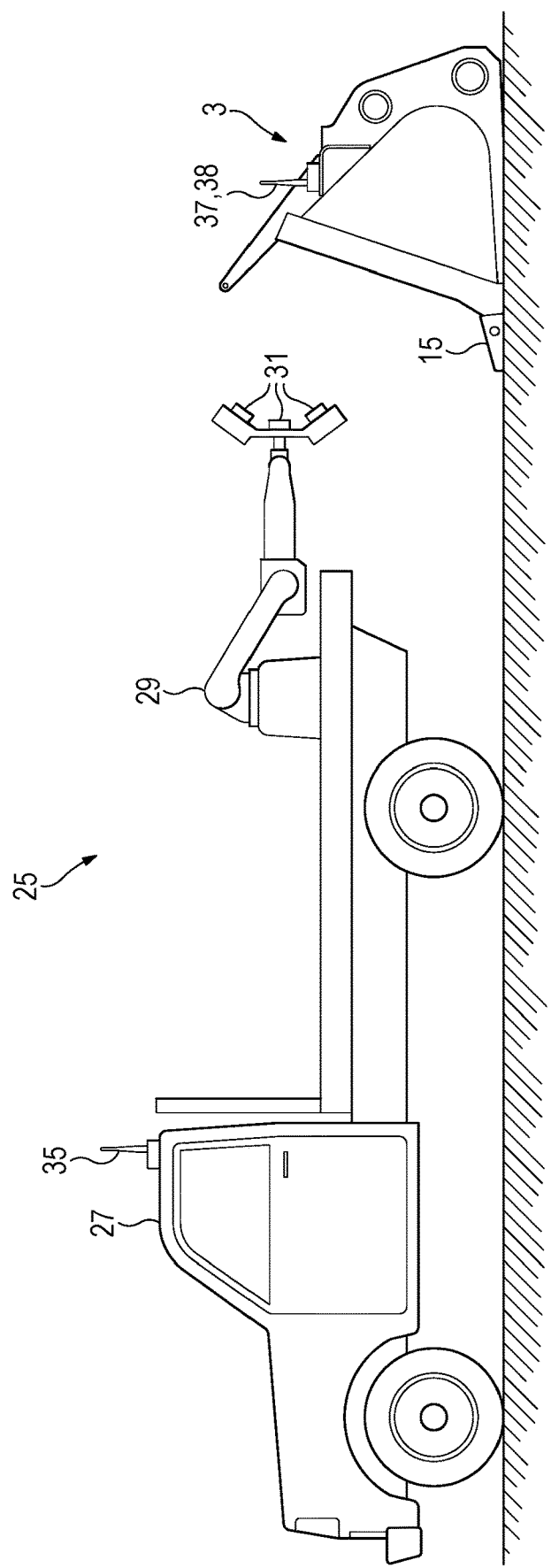
FIG. 8 illustrates a second example of a tool and its use in accordance with the present invention, i.e., where the tool is mounted on a vehicle and is used to monitor products on earth working equipment.

The mobile vehicle in the form of, e.g., a UAV, ground based mobile robot, or ROV may be brought to the earth working equipment 1 on a transport vehicle that can move from a warehouse, station or first earth working equipment to a second earth working equipment (FIGS. 7 and 8). The transport vehicle may have wheels and/or tracks. The transport vehicle is generally driven to the earth working equipment 1 by an operator located within the vehicle but could be driven remotely or autonomously. For example, the transport vehicle may be remotely driven with a joystick (not shown) and cameras (not shown) located on the transport vehicle. In another example, the transport vehicle may be fully automated and programmed to drive to the earth working equipment 1 needing wear members monitored. The transport vehicle can also be used for other service activity. In an alternative embodiment, the mobile vehicle with the monitoring tool 25 may be flown or driven to the earth working equipment without the need for a separate transport vehicle to move the tool from location to location (FIGS. 7 and 8).

Tool 25 may include a maneuvering device 29 (e.g., an articulated, controlled arm, driven universal joint, etc.) for maneuvering at least one electronic device or sensor 31 (FIGS. 7 and 8). Alternatively, the mobile device 27 supporting the monitoring tool 25 can be maneuvered to point the electronic device 31 in the desired direction without an additional maneuvering device 29. In certain embodiments, the maneuvering device 29 is mounted on a mobile vehicle 27 capable of maneuvering an electronic device 31 so that it has a clear line of sight deployed to monitor the products 15. The electronic device may be a surface characterization device, e.g., a camera 32 or other device that creates, e.g., a two or three dimensional representation of at least a portion of the product, or other representation of the product or product surface being monitored (FIGS. 7 and 8).

Figure 14:
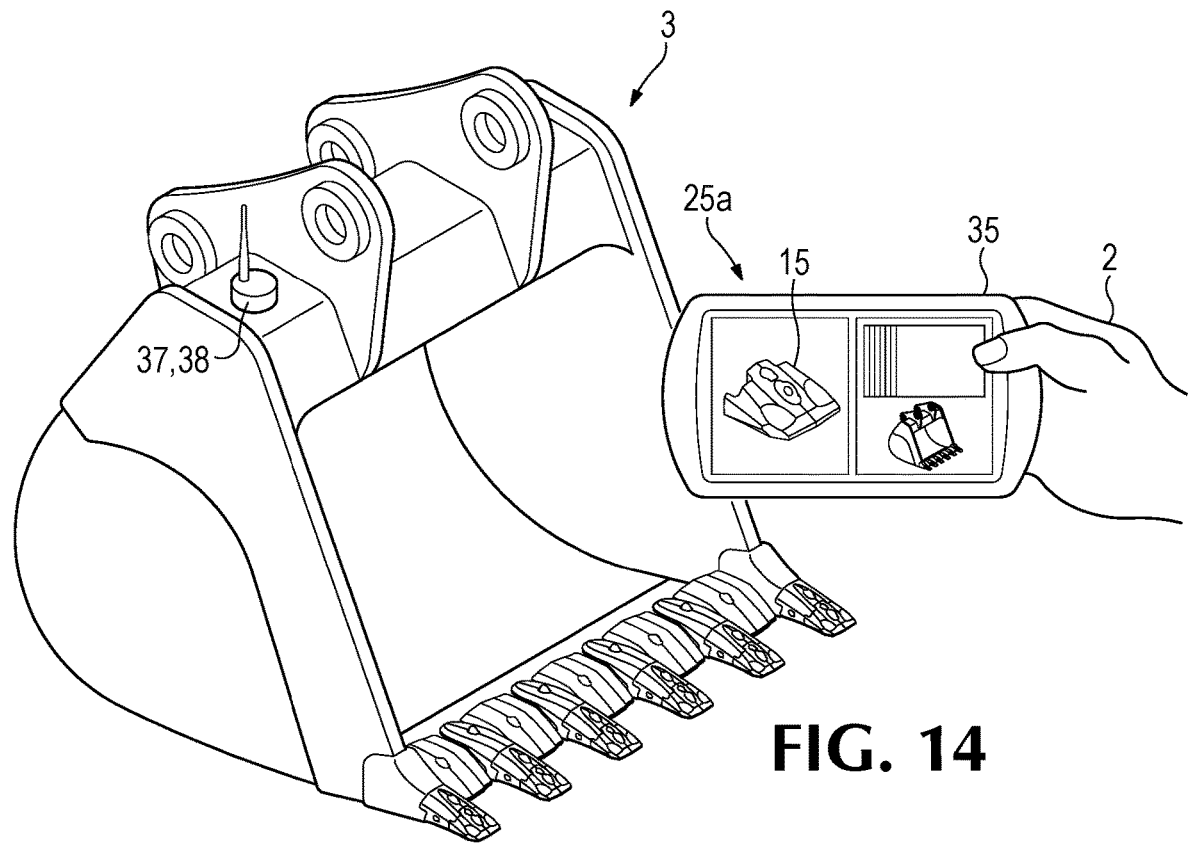
FIG. 14 illustrates the tool in another alternative use in accordance with the present invention, i.e., wherein a hand-held display is used with a monitoring system in accordance with the present invention.
Figure 15:
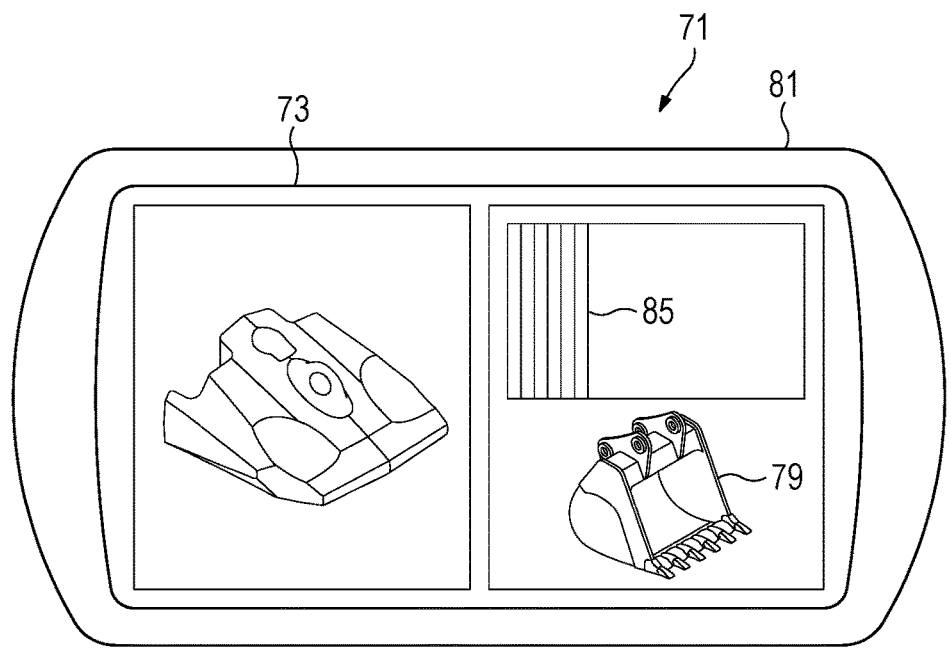
FIG. 15 is a front view of a mobile HMI to be used with a monitoring system in accordance with the present invention.

In an alternative embodiment, the tool 25a may be supported by a handheld device 28 that is carried or otherwise transported to, e.g., the bucket 3 of the earth working equipment 1 (FIG. 14). An operator 2 may physically hold the tool 25a as the tool monitors the product 15. The handheld device could alternatively be mounted on a stationary or adjustable support. The tool 25a may be, for example, a computer, a phone, a tablet, or other small device that can be held and/or carried by an operator 2.

In one embodiment, tool 25 has a surface characterization device 31 for generating, e.g., a two or three dimensional profile of at least a portion of the product 15 to be monitored. For example, device 31 might monitor only the bit portion of a point for wear and/or separation. The electronic device 31 may, e.g., generate a two or three dimensional point cloud representing the outer surface of the product 15 being monitored. The three dimensional representation may also, for example, be an optical image captured by a camera 32. In one embodiment, the electronic device 31 can generate data on its own or in combination with data from a database or remote device to determine the load within, e.g., a bucket or truck body. For example, the system may generate a two or three-dimensional a profile of the load 24 within a bucket or truck tray. In another example, the system may use density and/or volume data from tool 25 and load data from the haul truck hydraulic cylinders to determine the load carried by the haul truck.

Information and/or data received from the monitoring tool 25 can be sent to a remote device 37 in the cab (or elsewhere), may be provided to and/or combined with data from a handheld device, cloud database 194, other data sources, other remote device, etc. to provide information and analysis. Multiple antennas and/or remote devices could be used to increase the reliability of picking up the signal if desired or needed for the particular operation. The processor 198, or other elements of the system, may be operatively coupled with an Equipment Control Unit ECU 200. The ECU 200 may provide or receive information from the processor 198 and/or directly to or from the sensor(s) 31. The ECU 200 may provide data pertaining to, but not limited to, engine torque, fuel consumption, atmospheric temperature, engine temperature and the like. The ECU data may be coupled with sensor data, and/or data from other sources, and processed by the processor to provide various outputs.

The surface characterization device 31 may be, for example, a camera 32, a LiDAR device, a 3D laser device, a photogrammetry device, and or a combination thereof. The tool 25 may have a device 29 for maneuvering the at least one electronic sensor 31. The mobility of tool 25 and/or use of a maneuvering device 29 may enable the at least one electronic sensor 31 to have a clear line of sight to the product 15 or load 24 to be monitored. Device 29 could, e.g., be a controlled, articulated arm, swivel or other maneuvering implement.

Examples of LiDAR devices that may be used to generate a two or three dimensional point cloud or other representation of a product (e.g., a produce surface(s)) and/or load is a LiDAR device sold by Neptec Technologies Corporation under the name OPAL, and/or a LiDAR device sold by Leica Geosystems under the name Leica Pegasus: Two. The Zebedee and ZEB1 LiDAR devices are designed to be handheld devices but could be integrated with a UAV, ground based mobile robot, or ROV to generate the representation of the monitored product and/or load. Information generated by the LiDAR device could be output to a database or computer on the mobile device (such as a UAV, ground based mobile robot, ROV, service truck or handheld device) for further processing or may be output to a remote device database or computer on a remote device or other monitoring tool for further processing.

Examples of a 3D laser device that may be used to generate, e.g., a two or three dimensional point cloud (or other representation) of the monitored product, product surface(s) and/or load is a laser device sold by Creaform under the name Go!SCAN and a laser device sold by RIEGL under the name VUX-1. Like the LiDAR devices, the Go!SCAN 3D laser device is designed as a handheld device but could be integrated with a mobile vehicle, such as a service vehicle (e.g., a wheeled and/or tracked transport vehicle 27), a UAV, a ground based mobile robot, or ROV.

Numerous consumer digital cameras and/or DSLR cameras could be used to photogrammetrically generate a three dimensional or other representation of the monitored product and/or load. For example, Canon has a digital camera sold under the name EOS 5D, Nikon has a digital camera sold under the name D700, Leica Geosystems has a digital camera sold under the name RCD30, DOT Product LLC has a tablet based structured light camera sold under the name DPI-7, Structure Sensor and ISense have tablet based digital cameras, and Heuristic Lab has a smart phone digital camera under the name LazeeEye that could be used to photogrammetrically generate, e.g., a wear profile of the monitored product. The various cameras could be integrated with a mobile device such as a UAV, ground based mobile robot, ROV, service truck or handheld device to generate, e.g., a two or three dimensional profile and/or other information generated by the cameras could, e.g., be outputted to a database or computer on mobile device or a remote device for further processing. A remote device is a device that is remote from the monitoring device, and could include devices at one or more location.

A processor with programmable logic is used to process the information generated from the electronic sensor 31 that, e.g., captures the two or three dimensional profile of the product 15 and/or the load 24 being monitored. The programmable logic may be used on the mobile device as part of the monitoring tool and/or the programmable logic may be on a remote device in the form of, e.g., a computer that is remote to monitoring tool 25. Depending on what type of electronic device 31 is being used to generate, e.g., the profile, the programmable logic may be software sold by Autodesk under the name RECAP, software sold by PhotoModeler under the name PhotoModeler Scanner, software sold by Acute 3D under the name Smart3DCapture, software sold by Agisoft under the name PhotoScan, software sold by Trimble under the name Business Center, software by CloudCompare, software by MeshLab, software by LAStools, software by itSeez3D and/or various software known for processing three dimensional point cloud data.

Figure 9:
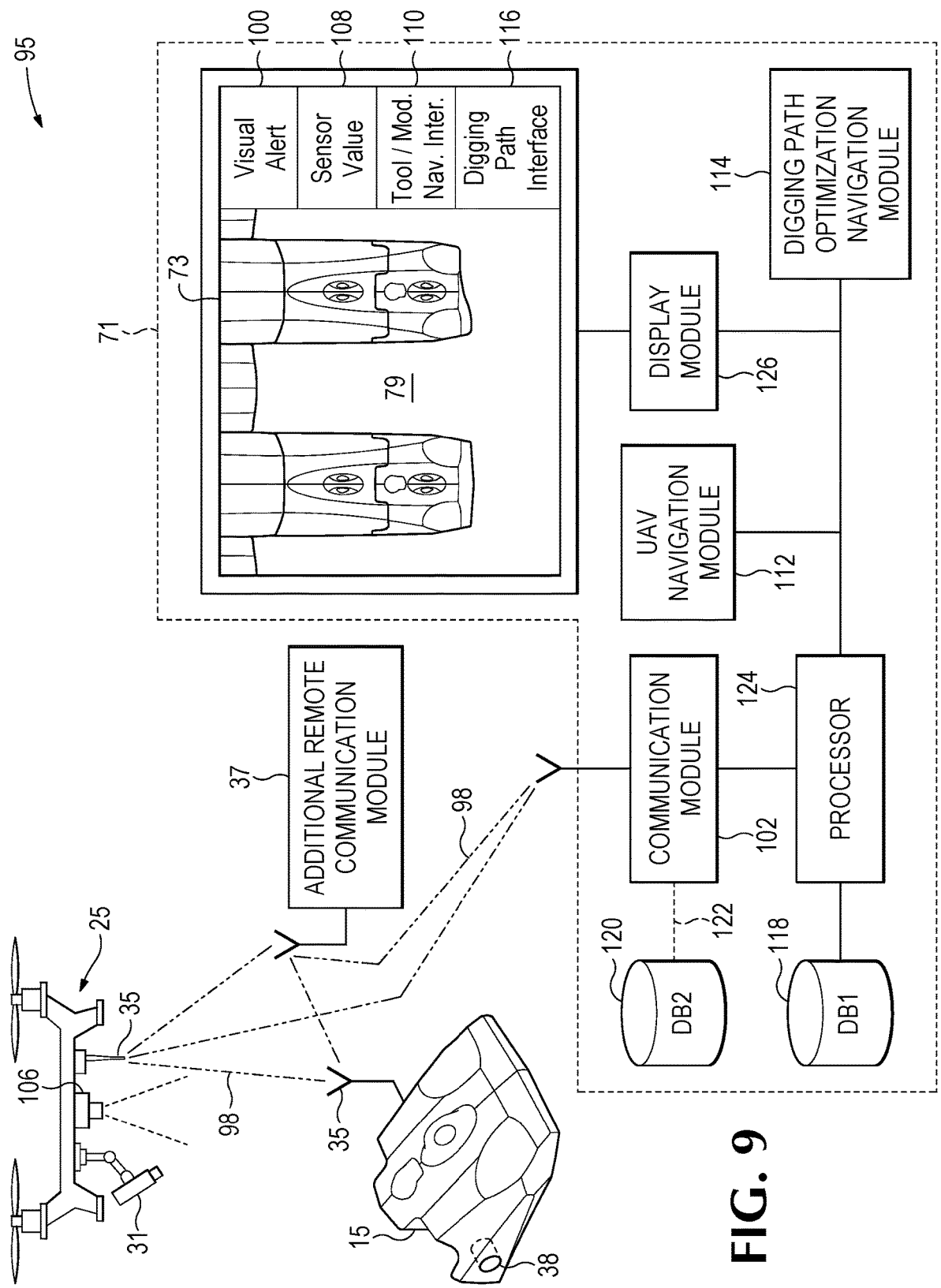
FIG. 9 is a schematic system diagram illustrating a system in accordance with the present invention.

FIG. 9 is a schematic system diagram illustrating an example monitoring system 95 to monitor one or more ground-engaging product. A sensor 31 (e.g., a surface characterization device) is physically coupled with, and or/installed on, the tool 25 and may be configured to sense a condition of the ground-engaging product 15. The sensor 31, and/or associated hardware or software may be configured to generate, e.g., a 2D or 3D profile of the product and/or capture and pass data via a wireless signal 98 from antenna 35 to a receiver 100 included with, or coupled with, a Human Machine Interface (HMI) 71. The signal 98 may be received and/or processed by a communication module 102. The HMI 71 may be configured to receive the profile, and/or to receive the data and to generate the profile. The generated profile may be, e.g., compared with existing 2D or 3D profiles retrieved from a first and/or second database 118, 120. The result of the comparison may trigger a notification which may be embodied as an alert 100. The example illustrated shows the alert 100 on the display 73 visible to an operator in the cab 104 of the earth working machine 1. As noted other, and/or additional, alerts may be used.

The tool 25, in one example using an unmanned aerial vehicle (UAV) 25 may, in some example embodiments, be configured to maintain a flight pattern determined at least in part on a physical location of the product 15. The UAV 25 may, for example, monitor a recognizable element on the product 15, monitor signal strength and the like, from a transmitter/antenna 36 coupled with the sensor 38 that may be coupled with the product 15, or use a GPS system. The HMI may maintain a flight pattern determined by, for example, predetermined criteria, according to programmable instructions present on the UAV 25, remote device 37, or Human Machine Interface HMI. The HMI 71 may also include a tool modification and/or navigation interface 110. The tool modification and/or navigation interface 110 may provide manual adjustment of, for example, sensor 31 position, camera angle, UAV position, UAV height, camera or sensor setting, etc. The adjustment may be effected by maneuvering device 29.

A camera 106 may be the surface characterization device supported in flight by the UAV tool 25 (or may be in addition to another surface characterization device) and may be directed to capture, e.g., a 2D or 3D profile, and in some cases an image, of at least a portion of the ground-engaging product continuously, at set times or event-based (e.g., upon receiving a trigger or issuance of the alert). The information gathered by tool 25 can be provided to a remote device, for processing or use, continuously, periodically, on demand, or in batches. Irrespective of the delivery mode, the system can be operated to provide historical and/or real-time data and/or assessment. A display 73 may be configured to display, e.g., a profile of the monitored product 79, and/or image captured by the sensor 31, and or camera 106. The image may be a live video feed. The display may be configured to display both still images and video images. The profile 79, or image may be captured from a vantage point determined relative to the product not primarily dependent of the operator manipulation of the excavating machine controls. The display 73 may also display a graphical representation 108 indicative of, for example, a level of wear. The graphical representation may be or include text and/or a numeric value and/or a condition, i.e. "broken tooth", and like. In this way an operator, or other worker at or associated with the worksite, may be made aware of a potential problem, or characteristic of the product via the alert 100 and may be able to confirm, or discount the condition, and/or provide a value judgement as to the severity of the condition. In this way unnecessary downtime may be avoided.

Movement of the UAV tool 25 may be effected according to one of: GPS coordinates; a datum established at the earth working operation; a datum established on the product, a datum established on the earth working equipment; and a datum established at a calculated point adjacent to the earth working equipment. The HMI 71 may include a UAV navigation module 112 that may include logic to control the UAV. Logic to control the UAV 25 may also, or instead be located on the UAV 25.

The HMI 71 may also include a digging path optimization module 114. Which may include logic to suggest a better optimized digging path to the operator. The better optimized digging path may be communicated via a digging path interface 116 included on the display 73. Information to optimize the digging path may include data from the sensor 38 coupled with the product 15, the remote communication module 37, the tool 25, and/or one or more databases 118, 120. The first database 118 may be resident in the HMI 71, the second database 120 may be coupled via a wired or wireless connection 122. The second database 120 may be in a cloud storage.

The HMI 71 may include a processor 124 to receive, send, and process the data from and to the various data sources, and data consumers, in the system 95. A display module 126 may include logic to receive data and format data to be displayed on the display 73.

Figure 10:
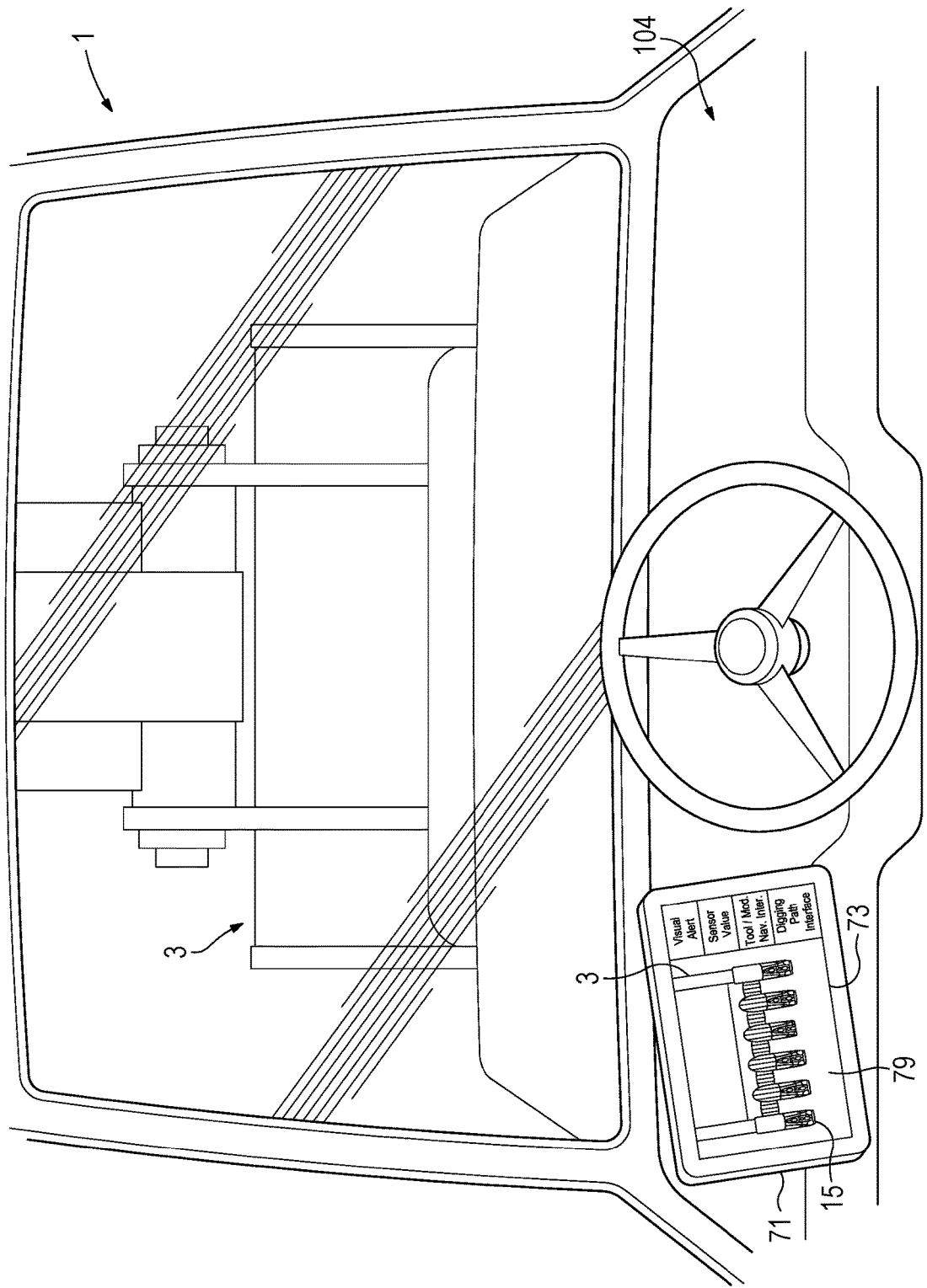
FIG. 10 is an elevational view illustrating an example view from the cab of a front loader in accordance with the present invention.

FIG. 10 is an elevational view illustrating an example view from the cab 104 of a front loader 1 in accordance with the present invention. Wear parts 15, in the form of teeth, fixed to a bucket may be partially or completely obscured from the operators view from the cab 104. The HMI 71 may be positioned conveniently for the operator. The bucket 3 and teeth 15 are shown on the display 73, e.g., as a generated 3D profile, and/or photographic or video graphic image from an advantageous vantage point. In this way the operator is able to make better informed decisions regarding the product (s) 15. The display, and/or a similarly configured display may also be available to other personnel at, associated with, or remote to the worksite.

In addition to the programmable logic for processing, e.g., three dimensional point cloud data, the tool 25 may have programmable logic for determining such things as the identity of the product, the presence or absence of the product, the current wear profile, the estimated wear life remaining, identifying the risk of loss and/or providing alerts to the operator. The programmable logic may, e.g., be able to compare the current wear profile or current risk indicators to a previously established wear profile, risk indicators and/or bit portion lengths in a database to determine the estimated wear life remaining, whether the product has separated from the earth working equipment, or to identify the risk that the product may become lost or damaged in the near future. The previously established wear profile may be a CAD model or other profile of a new product or may be a previously recorded profiles of the product. The previously established wear profile may be stored in a database on the mobile device or remote device. The programmable logic may also compare the current wear profile against a database containing the minimum wear profile for the product. Based on the known minimum wear profile, the current wear profile, and/or previously established wear profiles of the product, the programmable logic can determine the remaining life of the product.

Information regarding the wear profile of a product can be stored in a database on the mobile device or a remote device. The information may come from a number of sources. For example, the wear profiles may be of new product, a fully worn product, or profiles between a new condition and a fully worn condition. The condition of the product may be stored, e.g., as a two or three dimensional representation of the product. In other embodiments, the wear condition may be a two or three dimensional or other representation of the product. The representation of the product may be, for example, a three dimensional CAD file, a three dimensional point cloud representation of the product, a combination thereof, or another representation of the product that provides the database relevant data related to a wear condition of the product. Three dimensional or other representations of the products may be preloaded into the database or the sensor on the tool for monitoring the products. The tool may provide data to generate a representation, and the programmable logic may add the representation of product to the wear profile database. In other embodiments, a separate tool may be used to add representations to the wear profile database. In this way the wear profile database is able to be populated with a variety of wear profiles for a variety of products used on a variety of earth working equipment regardless of the manufacturer.

In addition to the data related to the wear profiles of the product, the programmable logic may receive information related to, e.g., how long the product has been in use, how many digging cycles the product has encountered, and or the mine geology to predict the remaining wear life of the product. The programmable logic may provide the operator the estimated remaining wear life as a unit of time, remaining units of material moved, or as a unit of digging cycles. The programmable logic may be programmed to produce a precautionary alert that a specific product is close to needing replacement. The alert may be, for example, a visual alert, haptic feedback, and/or an audio alert. The tool 25 or remote device 37 may wirelessly provide the alerts to equipment operators or others, and/or wireless devises for access by the operator or others such as maintenance personnel, mine site managers or the like. In addition, the programmable logic may be programmed to produce an alert if the profile indicates that the product has been lost or if the product has been worn so that it is equal to or less than the recommended minimum wear profile. In addition, the programmable logic may provide the operator an indication of current flaws or predictions of future flaws that may lead to loss, damage, or failure of the product that may lead to a reduction in productivity and/or equipment downtime.

Figure 11:
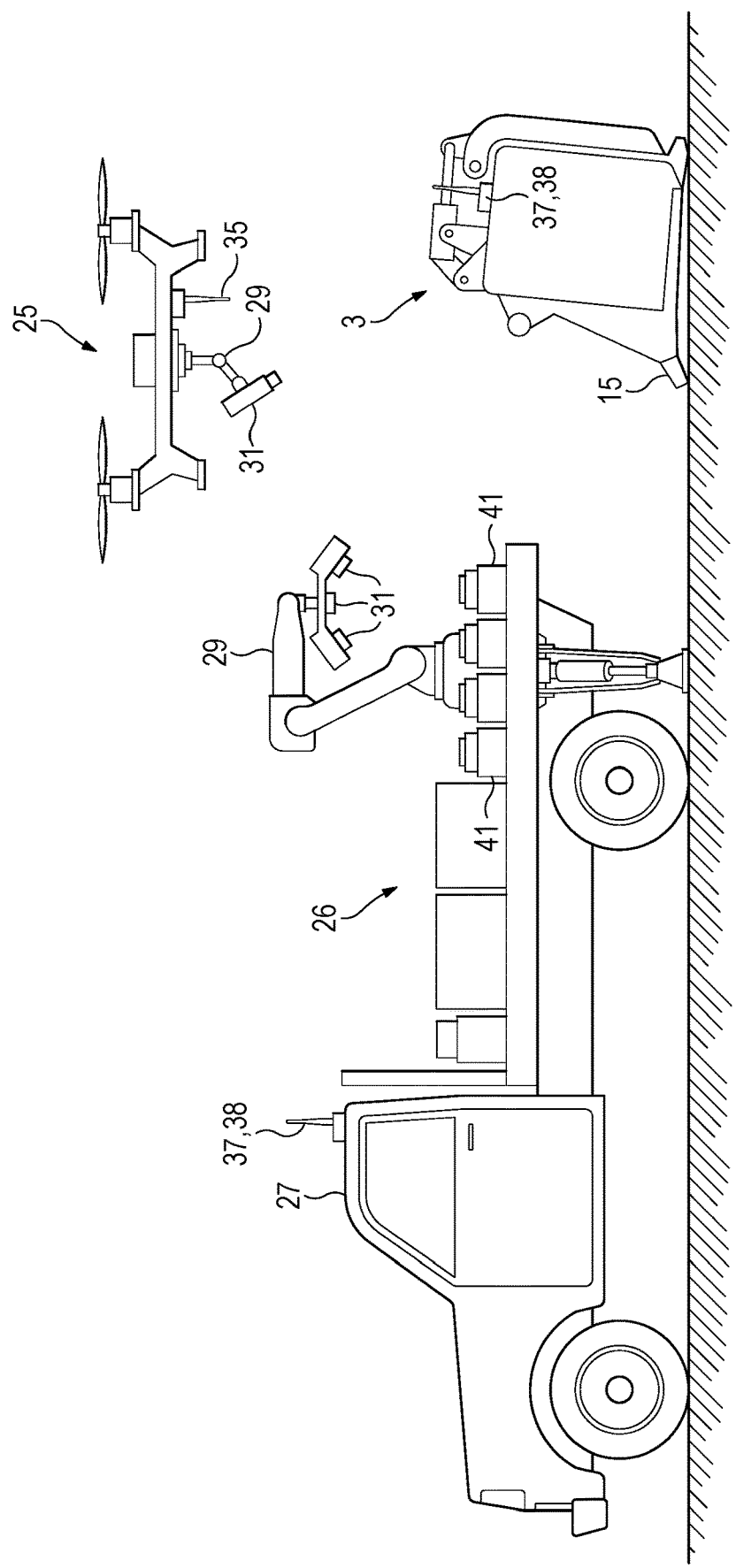
FIG. 11 illustrates the tool in a first example use in accordance with the present invention wherein the tool may be used in cooperation with a tool for removing and installing products.
Figure 12:
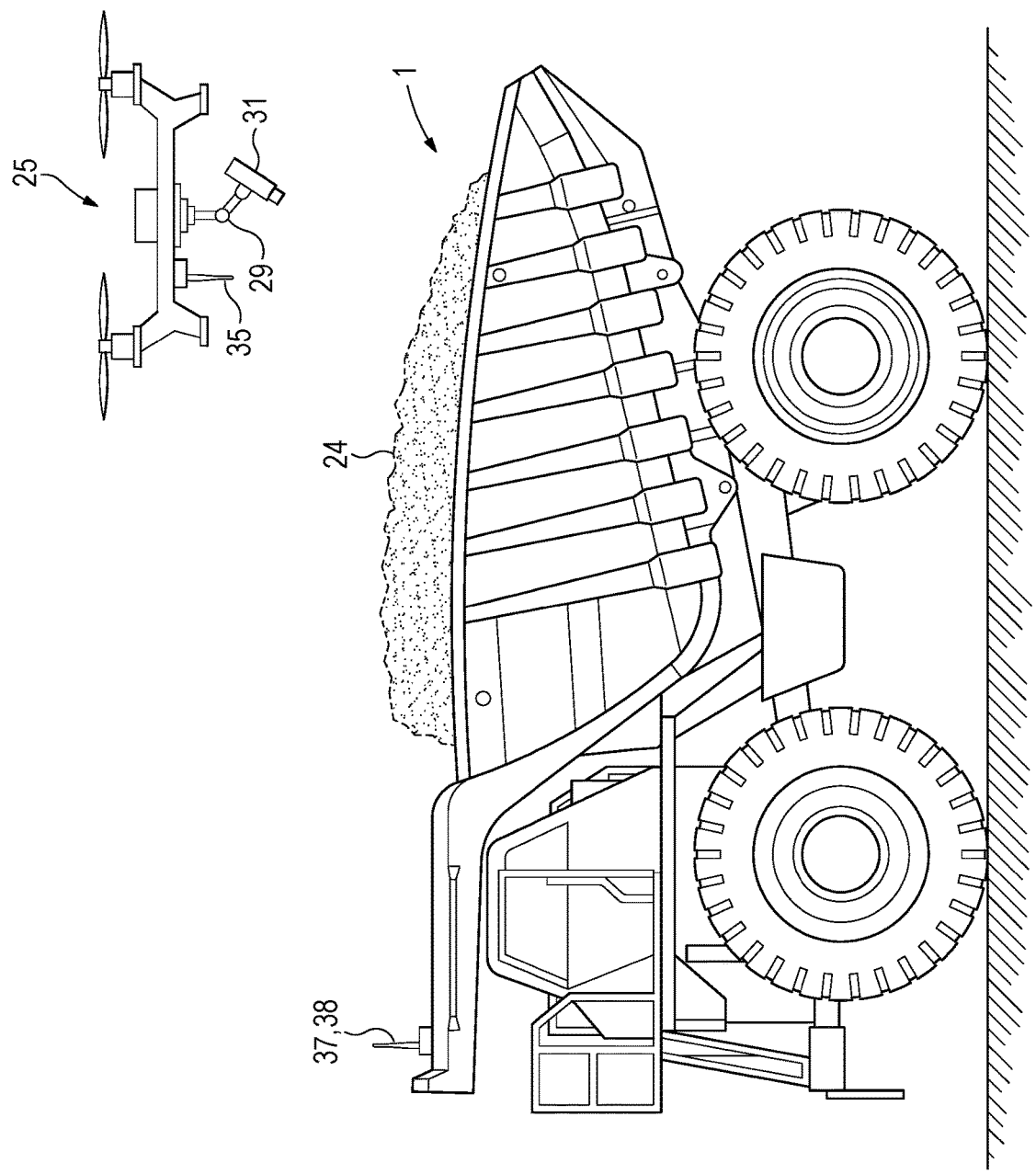
FIG. 12 illustrates the tool in another alternative use in accordance with the present invention, i.e., where the tool is used to monitor a loading condition of, e.g., a hopper for a crusher or the truck tray for a haul trunk such as used in mining operations.
Figure 13:
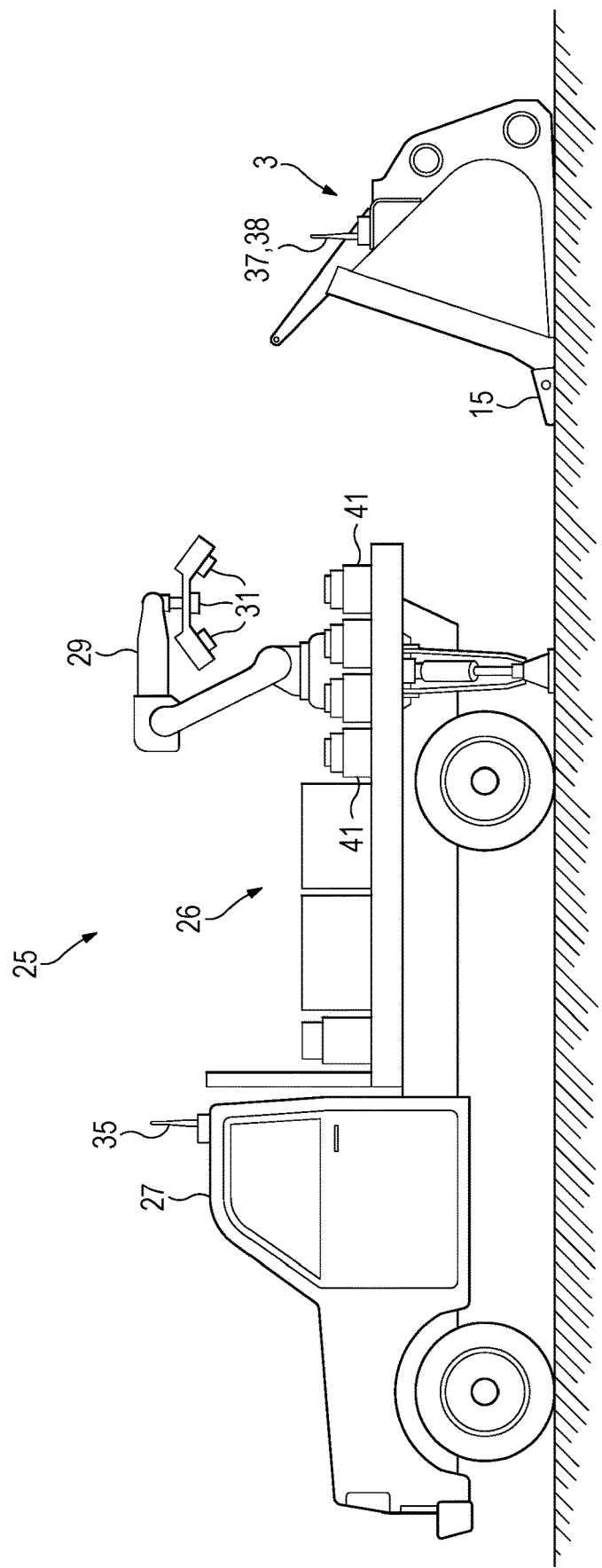
FIG. 13 illustrates the tool in a second example use in accordance with the present invention wherein the tool may be used in cooperation with a tool for removing and installing products.

Depending on the type of electronic sensor 31 that is used to determine the profile of the monitored product and/or the load, it may be necessary for monitoring tool 25 to come into close proximity with the earth working equipment. If the tool 25 has an electronic device 31 that requires the tool 25 to be in close proximity to the earth working equipment 1, the tool 25 may communicate with a remote device 37 on the earth working equipment 1 to aid the tool's obstacle avoidance system. For example, if the remote device 37 includes a GPS sensor located on, e.g., the bucket 3, the tool 25 may have programmable logic that calculates a protected zone around the remote device 37 (based on the known geometry of the bucket and the known geometry of the excavating equipment) so that the tool 25 does not enter the protected zone even when the bucket is moved. Receiving position information from a sensor located on the earth working equipment may also aid in helping the tool move (e.g., fly) close into the bucket 3 when the earth working equipment is not in use (FIG. 11). This may be helpful to determine, e.g., the condition and/or wear profile of the products being monitored. Using a mobile device such as a UAV, ground based mobile robot, ROV, service vehicle or handheld device to support a monitoring tool 25 for determining information about the product is advantageous in that the mobile device can provide unique vantage points and/or to take readings at virtually any point in the digging cycle without inhibiting the digging operation or endangering personnel. It also, as noted above, permits the sensors to closely approach the areas of interest (such as the products) for secure and reliable gathering of information. It also permits a coordinated and efficient monitoring of products on more than one earth working equipment, such as concurrently monitoring a bucket and a truck body, a bucket and the wear parts on the bucket, etc. One example includes the concurrent monitoring of both the load in a bucket and the load in a hopper or the truck tray receiving the material from the bucket. In addition, a monitoring tool on a mobile device can capture positions of the machine, boom, stick, bucket, and bank during the digging cycle with or without capturing additional information from the sensors 38. This information would be utilized for helping optimize/validate product design and for optimizing/validating product performance for the customer.

The tool 25 may have a communicating device for communicating with a remote device 37 that is remote to the tool. For example, the tool 25 may communicate with a remote device 37 in the form of, e.g., an antenna, a computer, a database, and/or at least one electronic sensor 38 that is remote to the tool. The electronic sensor 38 may be, for example, attached to monitored products, the earth working equipment 1, or the transport vehicle 27. The electronic sensor may be located on a product that engages the ground to be excavated (such as a point) or may be located on the machine that maneuvers the product that engages the ground. For example, the electronic sensor 38 may be located on the earth working equipment 1 (FIG. 7) or the electronic sensor 38 may be located on a bucket 3 (FIGS. 7, 8, 11 and 14), a blade, a truck body (FIGS. 7, 8 and 11-13), a point, an intermediate adapter, an adapter, a shroud, a nose, a lip, a wear runner, a truck liner, or the like. The electronic sensor 38 may communicate with additional electronic sensor(s) on the earth working equipment 1 or with a database or computer (e.g., an onboard computer). However, in this embodiment, at least one of the electronic sensors 38 and/or a database or computer has a device 37 for communicating with the tool 25. The device 37 for example, may include a wireless device. Sensors 38 may be of the type disclosed in any one of U.S. Patent Application 62/198,552, U.S. Patent Application 62/175,109, U.S. Patent Application 62/234,463, and U.S. patent application Ser. No. 15/043,482, filed Feb. 12, 2016, (now granted as U.S. Pat. No. 10,011,975), which is incorporated by reference in its entirety.

The electronic device 37 (e.g., sensors 38, a database and/or a computer) may provide the tool 25, for example, with information related to location, product type, ID, how long the product has been on the machine, how many digging cycles the product has experienced, information related to the mine geology, and/or other information useful for determining the estimated wear life remaining and/or, identifying the risk and predict the potential to damage or lose the product, attachment, component, or earth working equipment, and/or determining information related to the load within the earth working equipment. In some instances, the tool 25 may reference a database or computer with information related to the mine geology to determine the estimated wear life remaining and/or determine information related to the load within the earth working equipment.

The electronic sensor 38 may be, for example, passive or active and may include a receiver, transmitter, and/or a digital sensor. The receiver and/or transmitter may be, for example, an electromagnetic wave receiver and/or transmitter, a laser receiver and/or transmitter, or Global Positioning System (GPS). The electromagnetic waves preferably have a wavelength greater than the visible spectrum (e.g., infrared, microwave, or Radio Frequency [RF]), but may be in the ultrasonic spectrum. Further, the electronic sensor may, e.g., be an accelerometer, a camera, a digital inclinometer unit, a digital compass, and/or an RFID.

In addition, monitoring tool (with or without supplemental information from the sensors associated with the products or information contained in a database) can provide information on the ground to be excavated and the digging path of the bucket. Programmable logic can use the information on the ground to be excavated and the digging path to suggest a digging path that will increase productivity. The information from the sensors and programmable logic may be communicated to the earth working equipment so that the earth working equipment uses the information to adjust the bucket's digging path for optimal productivity. In alternative embodiment, information from the sensors and programmable logic may be communicated to an equipment operator so that the operator may adjust the bucket's digging path for optimal productivity.

The tool 25 may monitor the load 24 within the earth working equipment 1 (e.g., a bucket and/or a truck bed) without interrupting the operation of the earth working equipment 1. Monitoring the load of the earth working equipment allows the operators of the earth working equipment to know, e.g., when they have reached the optimal load so that the operator does not overload the earth working equipment and potentially damage the products or other components of the earth working equipment. It is also important that the operator does not continually under load the earth working equipment so that production is suboptimal. The tool may use programmable logic to determine the amount of earthen material within the earth working equipment based on, e.g., a two or three dimensional profile of the load 24. The tool 25 may also determine an estimated weight of the load 24 within the earth working equipment 1 based on volume (determined, e.g., from the profile), the degree of fragmentation of the material, and/or the material type. The degree of fragmentation of the material may be determined by the tool 25 or may be determined by a device 37 remote to the tool 25. The device 37, for example, may be located on the earth working equipment 1. The type of material being excavated may be determined by the tool 25, determined by a device 37, or the tool 25 may reference a database with the information. The tool 25 may also verify the estimated weight of the load 24 by comparing the estimated weight to the stated weight from a load monitoring unit installed on the earth working equipment. The tool 25 may also use programmable logic for determining the number of loads, the cycle time between loads, the fill rate of the earth working equipment, and/or the effectiveness of the loading of the earth working equipment. The tool 25 may also provide data that is subject to real-time processing to assist, e.g., in efficient loading of a truck tray. For example, the system may provide information to the operator on the load to gather (e.g., half a bucket) to completely fill the awaiting haul truck.

The results and alerts from the process may be sent to at least one Human Machine Interface (HMI) 71. The tool may also communicate with other computer systems wirelessly, or through a wired connection which specific product(s) may need maintenance either because the product part is lost or because the product is worn past the minimum wear profile. In addition the tool may store all of the results from the process. The HMI 71 may be a wireless device 81 (FIG. 10), may be integrated with a display system currently in the excavating equipment (e.g., with the OEM display), integrated with a new display system within the excavating equipment, and/or may be located in a remote location. The HMI 71 may be configured to provide a graphical display 73 of the current status of the product (FIG. 10). The HMI 71 may, for example, provide visual alerts (e.g., text and/or pictorial images), haptic feedback (e.g., vibrations), and audio alerts regarding the status of each product. The visual alert may be, for example, a graphical picture 73 displaying each monitored product and the status of each product (i.e., absent/present, acceptable wear, damage, needing maintenance, and reduction in productivity). The HMI 71 may be designed to display a live image 79 of the product so that an operator can visually check that an alert is valid. The HMI may be designed to display a history chart 85 so that an operator can determine when an alert happened so that an operator can take the necessary actions if a product is lost.

In an example use, the tool 25 is brought to the earth working equipment 1 with the product 15 to be monitored. The tool 25 has a communicating device 35 for receiving and/or transmitting information from or to a remote device 37 such as one with an electronic sensor 38, a database and/or computer. The tool 25 is positioned separate from (e.g., flies above) the earth working equipment 1 and generates, e.g., three dimensional profiles of the loads 24 within ground-engaging products (e.g., a bucket) using at least one electronic sensor 31. Programmable logic on the tool 25 and/or remote device 37 can process the information from the at least one electronic device 31 and may additionally use the information from the remote device 37 and/or the database to determine, e.g., the number of times the earth working equipment has been filled, the average time it takes to fill the earth working equipment, the fill rate of the earth working equipment, the volume within the earth working equipment, and/or the effectiveness of the loading process. The tool 25 may also, or instead, generate, e.g., two or three dimensional profiles of the products 15 on the earth working equipment 1. The programmable logic for the tool 25 processes the information from the at least one electronic device 31 and may also use the information from the remote electronic device 38, database and/or computer to determine characteristics of the product 15. The programmable logic can, e.g., provide an estimated wear life remaining for the product 15 and provides an estimate on the likelihood that the product 15 will be lost, damaged, or lead to a reduction in productivity or damage to the earth working equipment. The programmable logic can also, e.g., provide an alert that the product 15 is acceptable for continued use or that the product 15 should be replaced. When the earth working equipment is not in use, the tool 25 may move in close proximity to the earth working equipment to better analyze the status of the product 15.

In another example, a monitoring tool 25 can provide data for a real-time assessment of characteristics of an operation. For example, the tool can monitor the load gathered in a bucket and in the truck tray being filled to provide information to the operator on more efficiently filling the truck tray. As an example, the system may indicate the awaiting haul truck will be completely filled with the bucket being only partially (e.g., half) filled. In this way, the system can increase the efficiency and production of the operation. Real-time assessments can be used in other ways such as to optimize the digging path, schedule maintenance, estimate production, etc.

In another example, a monitoring tool 25 can be used to generate data usable to map a mine site or other earth working site to estimate characteristics of the ground-engaging products on earth working equipment used at the site. For example, the gathered data could be used to generate contour-style mapping of wear rates for ground-engaging products to better determine such things as product replacement schedules, costs, etc. In one example, the data gathered by tool 25 could be combined with other data such as mine geology, GPS data, fragmentation, etc. The data could be used to map other characteristics or process the site data in ways other than mapping to generate similar information.

Although the above discussion has discussed the invention primarily in connection with a load within a bucket and teeth on a bucket, the tool can be used to create, e.g., a two or three dimensional profile of other products or product surface(s) on a bucket such as shrouds, wings, and/or runners or the bucket or other earth working equipment attachments and components. Moreover, systems of the present invention can also be used to monitor the presence and or condition of products on other types of earth working equipment such as runners on chutes or truck trays, or end bits on blades.

The above disclosure describes specific examples for a tool for monitoring the load within an earth working equipment and the status of ground-engaging products on earth working equipment. The system includes different aspects or features of the invention. The features in one embodiment can be used with features of another embodiment. The examples given and the combination of features disclosed are not intended to be limiting in the sense that they must be used together.

The invention claimed is:

1. A monitoring system comprising:
an excavating machine including a bucket having a plurality of wear parts; and
a monitoring tool separate from the excavating machine, wherein the monitoring tool includes an unmanned aerial vehicle that is movable independently of the excavating machine to different locations relative to the excavating machine, and an electronic surface characterization sensor secured to the vehicle to detect the absence of the wear parts on the bucket and/or the condition of the bucket and/or the wear parts.

2. A monitoring system in accordance with claim 1 wherein the surface characterization device is an optical camera.

3. A monitoring system in accordance with claim 1 wherein the surface characterization device creates a point cloud representation of at least one portion of the bucket and/or the wear parts.

4. A monitoring system in accordance with claim 1 including a processor to receive information detected by the sensor and determine the condition of the bucket and/or the wear parts and/or whether the wear parts have separated from the bucket.

5. The monitoring system of claim 1, wherein the vehicle is autonomous.

6. The monitoring system of claim 1, wherein the unmanned aerial vehicle includes a processor that calculates a protected zone around the excavating machine to control a flight pattern of the unmanned aerial vehicle so the unmanned aerial vehicle does not enter the protected zone.

7. The monitoring system of claim 1, further comprising a position sensor located on the excavating machine, and wherein the unmanned aerial vehicle includes a processor configured to receive position information from the position sensor and to control a flight pattern of the unmanned aerial vehicle based at least in part on the position information.

8. The monitoring system of claim 1, further comprising a remote electronic device separate from the earth working equipment and wherein the remote electronic device is configured to receive the characteristic determined by the electronic sensor, retrieve information from a database, and compare the characteristic to the information.

9. The monitoring system of claim 8, wherein the information includes a wear profile.

10. The monitoring system of claim 1, wherein the monitoring tool includes a maneuvering device for maneuvering the sensor to point the sensor in a desired direction without additional maneuvering of the vehicle.

11. The monitoring system of claim 1, wherein the monitoring tool includes an obstacle avoidance system operable to avoid contacting the excavating machine.

12. The monitoring system of claim 11, wherein the excavating machine includes a device that communicates position information to the monitoring tool to aid the obstacle avoidance system.

13. The monitoring system of claim 1, wherein the sensor captures positions of components of the excavating machine.

14. The monitoring system of claim 1, wherein the sensor detects loads gathered in the bucket during use of the excavating machine.

15. The monitoring system of claim 1, wherein the monitoring tool includes a communicating device for receiving information from a remote device and/or transmitting information detected by the sensor.

* * * * *